United States Patent
Nakamura et al.

(10) Patent No.: US 7,890,647 B2
(45) Date of Patent: Feb. 15, 2011

(54) CONTENT DISPLAY-PLAYBACK SYSTEM, CONTENT DISPLAY-PLAYBACK METHOD, RECORDING MEDIUM HAVING CONTENT DISPLAY-PLAYBACK PROGRAM RECORDED THEREON, AND OPERATION CONTROL APPARATUS

(75) Inventors: Junichi Nakamura, Chiba (JP); Hideki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1134 days.

(21) Appl. No.: 11/419,639

(22) Filed: May 22, 2006

(65) Prior Publication Data
US 2006/0262220 A1    Nov. 23, 2006

(30) Foreign Application Priority Data
May 23, 2005    (JP)    ............................... 2005-150226

(51) Int. Cl.
G06F 15/16    (2006.01)
H04N 7/18    (2006.01)

(52) U.S. Cl. ........................................ 709/231; 725/87

(58) Field of Classification Search ................. 709/231; 725/87, 93, 86
See application file for complete search history.

(56) References Cited

U.S. PATENT DOCUMENTS 6,757,907 B1 *    6/2004    Schumacher et al. .......... 725/87
2003/0005452 A1 *    1/2003    Rodriguez .................... 725/86
2003/0061369 A1 *    3/2003    Aksu et al. ................... 709/231
2004/0093096 A1 *    5/2004    Huang et al. .................. 700/17
2004/0267952 A1 *    12/2004    He et al. ...................... 709/231
2005/0174489 A1    8/2005    Yokoyama et al.
2006/0149850 A1 *    7/2006    Bowman ..................... 709/231
2008/0201753 A1 *    8/2008    Arling et al. ................. 725/114

FOREIGN PATENT DOCUMENTS

| JP | 2003-179898 | 6/2003 |
| JP | 2003-333359 | 11/2003 |
| JP | 2003-333579 | 11/2003 |
| JP | 2003-348125 | 12/2003 |

* cited by examiner

Primary Examiner—Nathan Flynn
Assistant Examiner—Chirag Patel
(74) Attorney, Agent, or Firm—Oblon, Spivak, McClelland, Maier & Neustadt, L.L.P.

(57) ABSTRACT

A content display-playback system includes at least one server that distributes audio-visual content via streaming, and at least one client that plays back, by streaming, the content distributed via streaming from the server, and the server and client are connected. The client beforehand makes settings regarding a client operation to be performed for submitting a streaming distribution request to the server to perform playback by streaming.

14 Claims, 17 Drawing Sheets

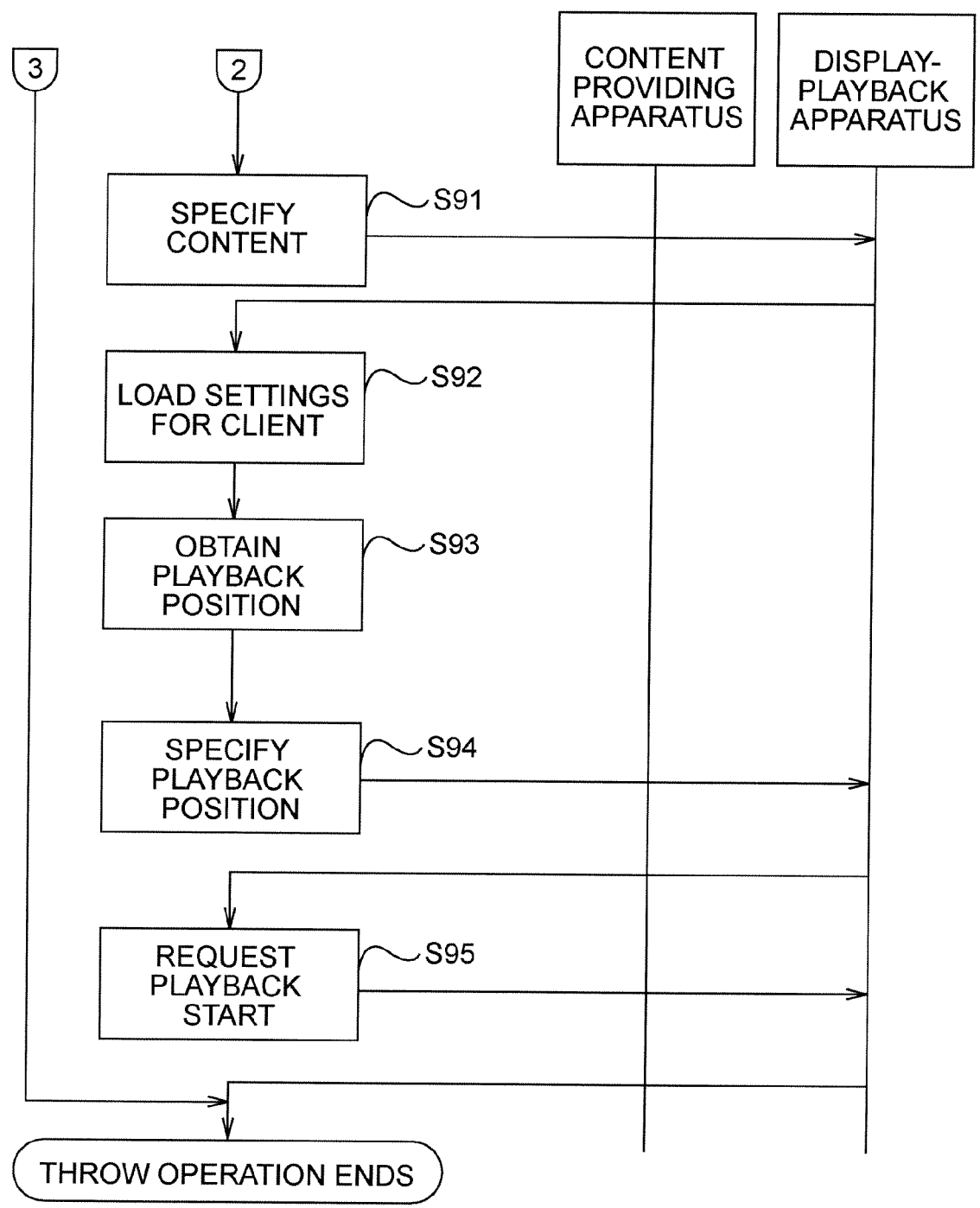

CONTENT DISPLAY-PLAYBACK SYSTEM, CONTENT DISPLAY-PLAYBACK METHOD, RECORDING MEDIUM HAVING CONTENT DISPLAY-PLAYBACK PROGRAM RECORDED THEREON, AND OPERATION CONTROL APPARATUS

CROSS REFERENCES TO RELATED APPLICATIONS

The present invention contains subject matter related to Japanese Patent Application JP 2005-150226 filed in the Japanese Patent Office on May 23, 2005, the entire contents of which are incorporated herein by reference.

BACKGROUND OF THE INVENTION

1. Field of the Invention

The present invention relates to a content display-playback system and content display-playback method in which a content providing apparatus and display-playback apparatus connected to a wired or wireless network are controlled in operation by an operation control apparatus so that video information can be transmitted among the content providing apparatus, the display-playback apparatus, and the operation control apparatus and that video can be displayed on the display-playback apparatus and the operation control apparatus. The present invention also relates to a recording medium having recorded thereon a content display-playback program implementing the content display-playback method. The present invention also relates to an operation control apparatus in the content display-playback system for controlling operations of the content providing apparatus and the display-playback apparatus via the network.

2. Description of the Related Art

With the prevalence of video recorders capable of recording television (TV) broadcast programs onto videotapes, a "time-shift" viewing style in which users view TV broadcast programs at any convenient time, rather than the broadcast time, has become common. In such a viewing style, the users record many TV broadcast programs and view them later. The recent evolution of recording media from videotapes to hard disks allows the users to easily store a larger amount of video data in hard disks (storage devices) without worrying about the capacity. Such hard-disk-based video recorders are hereinafter referred to as "digital video recorders (DVRs)", unless specifically stated otherwise.

In a recent content display-playback system, an audio-visual (AV) content server (content providing apparatus) and a display-playback apparatus, such as a cathode ray tube (CRT), a liquid crystal display (LCD), or a plasma display, are connected to a wired or wireless network established in a home, office, local area, or global area environment. In this content display-playback system, for example, a user who connects at least one digital video recorder to the network as an AV content server can view a recorded TV broadcast program over the network even at a place distant from the AV content server.

In an existing TV set, a user operates buttons or the like on a remote operation apparatus, an operation control apparatus, or a remote commander (hereinafter referred to as a "remote controller") for the TV set to display a menu for selection of an available operation on a display screen of the TV set. The user uses the remote controller for the TV set to select an item of interest, and operates the remote controller according to guidance displayed on the display screen to perform the desired operation, such as image quality control or timer setting.

In a receiver for receiving a satellite broadcast signal, such as a set-top box (STB) or an integrated receiver decoder (IRD), electronic program guide (EPG) data is displayed on the display screen of a monitor receiver. A user uses a remote controller attached to the receiver to select a desired program based on the EPG displayed on the display screen of the monitor receiver, whereby a desired one of channels available on the receiver can be selected.

As such, the TV set or the receiver for receiving a TV broadcast signal is configured to provide a user-friendly easy-to-use selection of an item of interest by combining a guide information view, such as a menu, guidance, or EPG, on the display screen with the operation of the remote controller.

In some cases, however, the above-mentioned operation in which necessary information, such as a menu or guidance, is displayed on the display screen of a TV set or a receiver, such as an STB or IRD, and a user operates a remote controller while viewing the information to perform a desired operation on the TV set or the like is complicated.

For example, the user scrolls through a plurality of menu pages or frequently operates the remote controller to move a cursor over the display screen to display a menu page including an item of interest from the plurality of menu pages, and further sets the selected item using the remote controller.

With the employment of LCD panels and the like, the compactness and portability of monitor devices for TV sets and the like have increased, which are designed to be operable within the vicinity of the users. In such cases, remote controllers for the TV sets are no longer necessary. Moreover, the users may be dissatisfied with the existence of remote controllers for operating external input devices, such as receivers, for supplying video signals and audio signals to the TV sets.

The present inventors have proposed a two-way communication system capable of setting up a more easy-to-use home network in which a display device can be used to view video information, such as a television program, and to listen to audio information and in which a base device for supplying a video signal to the display device and an external input device connected to the base device can be remotely operated by means of operation display information displayed on a display element of the display device and a touch position detector, such as a touch panel, to allow remote operation without performing any bothersome operation. This system enables remote operation of the base device and the external input device connected to the base device by means of the operation display information displayed on the display element of the display device and the touch position detector, such as a touch panel, and enables the desired video to be selected and displayed on the display device by means of an easy operation.

The present inventors have further proposed a content display-playback system and a video display control apparatus, which are disclosed in Japanese Unexamined Patent Application Publication No. 2003-333359, in which a video signal is supplied from a base device to a plurality of display devices using the above-mentioned two-way communication system, wherein a user only strokes the surface of the display screen of a display device with his/her finger to transmit and receive video between video devices to provide sensible switching, unlike a typical button operation of a remote controller. Specifically, in response to a gesture input provided by the user who moves his/her finger upward on a surface of a touch panel provided on an LCD of a portable display device, a "throw" function of switching the display of video A from the portable display device to a larger display device on which video B has been displayed is carried out. In response to a gesture input provided by the user who moves his/her finger downward on the surface of the touch panel provided on the LCD of the portable display device, a "catch" function of switching the display of the video B from the larger display device to the portable display device on which the video A has been displayed is carried out. The throw/catch functions disclosed in Japanese Unexamined Patent Application Publication No. 2003-333359 allow intuitive switching between a plurality of display devices.

SUMMARY OF THE INVENTION

In a content display-playback system of the related art including at least one content providing apparatus (server) capable of distributing AV content via streaming and at least one client that receives the distributed content, in response to a streaming distribution request from the client, the AV content server generally plays back the content from the beginning.

In a content display-playback system in which at least one digital video recorder is connected as an AV content server to the network, with the use of the throw/catch functions disclosed in the above-noted publication, it is conceivable to transmit and receive video data located on the AV content server between the portable display device (first client) and the larger display device (second client). The throw/catch functions allow easy streaming playback on a desired client, which may inconvenience some users in performing operations because the desired operations differ from one user to another.

It is therefore desirable to provide a content display-playback system and content display-playback method in which the playback start position can be set according to user's preferences when video data located on a content providing apparatus, which is a server, is displayed and played back by one or a plurality of clients while the video data is transmitted and received among the server and the client or clients.

It is further desirable to provide a recording medium having recorded thereon a content display-playback program in which the playback start position can be set according to user's preferences when video data located on a content providing apparatus, which is a server, is displayed and played back by one or a plurality of clients while the vide data is transmitted and received among the server and the client or clients.

It is further desirable to provide an operation control apparatus in which the playback start position can be set according to user's preferences when video data located on a content providing apparatus, which is a server, is displayed and played back by one or a plurality of clients while the video data is transmitted and received among the server and the client or clients.

According to an embodiment of the present invention, there is provided a content display-playback system including at least one server that distributes audio-visual content via streaming, and at least one client that plays back, by streaming, the content distributed via streaming from the server, wherein the server and the client are connected. In the content display-playback system, the client beforehand makes settings regarding a client operation to be performed for submitting a streaming distribution request to the server to perform playback by streaming.

According to an embodiment of the present invention, there is provided a content display-playback system including at least one server that distributes audio-visual content via streaming, and a plurality of clients that play back, by streaming, the content distributed via streaming from the server, wherein the server and the clients are connected. In the content display-playback system, the plurality of clients include a first client and a second client, and the second client makes settings regarding an operation of the first client and an operation of the second client when a streaming distribution request is received from the second client during streaming distribution to the first client.

According to an embodiment of the present invention, there is provided a content display-playback method for a content display-playback system in which at least one server that distributes audio-visual content via streaming and at least one client that plays back, by streaming, the content distributed via streaming from the server are connected. The content display-playback method includes the step of allowing the client to beforehand make settings regarding a client operation to be performed for submitting a streaming distribution request to the server to perform playback by streaming.

According to an embodiment of the present invention, there is provided a content display-playback method for a content display-playback system in which at least one server that distributes audio-visual content via streaming and a plurality of clients that play back, by streaming, the content distributed via streaming from the server are connected, the plurality of clients including a first client and a second client. The content display-playback method includes the step of allowing the second client to make settings regarding an operation of the first client and an operation of the second client when a streaming distribution request is received from the second client during streaming distribution to the first client.

According to an embodiment of the present invention, there is provided a recording medium having recorded thereon a content display-playback program executed by a content display-playback system in which at least one server that distributes audio-visual content via streaming and at least one client that plays back, by streaming, the content distributed via streaming from the server are connected. The content display-playback program allows the client to make settings regarding a client operation to be performed for submitting a streaming distribution request to the server to perform playback by streaming.

According to an embodiment of the present invention, there is provided a recording medium having recorded thereon a content display-playback program executed by a content display-playback system in which at least one server that distributes audio-visual content via streaming and a plurality of clients that play back, by streaming, the content distributed via streaming from the server are connected, the plurality of clients including a first client and a second client. The content display-playback program allows the second client to make settings regarding an operation of the first client and an operation of the second client when a streaming distribution request is received from the second client during streaming distribution to the first client.

According to an embodiment of the present invention, there is provided an operation control apparatus in a content display-playback system. The operation control apparatus is used as a client connected to a server that distributes audio-visual content via streaming, and is operable to play back, by streaming, the content distributed via streaming from the server, wherein the content-display-playback operation control apparatus beforehand makes settings regarding a client operation to be performed for submitting a streaming distribution request to the server to perform playback by streaming.

According to an embodiment of the present invention, there is provided an operation control apparatus in a content display-playback system. The operation control apparatus is used as one of a plurality of clients, connected to at least one server that distributes audio-visual content via streaming, and is operable to play back, by streaming, the content distributed via streaming from the server, wherein the content-display-playback operation control apparatus beforehand makes settings regarding an operation of the operation control apparatus and an operation of a first client in the plurality of clients when the operation control apparatus submits a streaming distribution request during streaming distribution to the first client.

According to an embodiment of the present invention, for example, when a streaming distribution request for standby content is initially submitted from a client, the content can be played back from the beginning.

When a streaming distribution request is submitted from a client to view the continued part of the standby content, the content can be played back from a specified playback position. When distribution of continued part of content currently played back by streaming on a client is requested, the content can be played back from the beginning or from a current playback position at which the request is submitted. Settings as to whether or not the initial streaming distribution is terminated can also be made.

The content display-playback system and content display-playback method according to the embodiments of the present invention enable the playback start position to be set according to user's preferences when video data located on a content providing apparatus, which is a server, is displayed and played back by one or a plurality of clients while the video data is transmitted and received.

The recording medium having recorded thereon the content display-playback program according to the embodiment of present invention is employed in the content display-playback system, thus enabling the playback start position to be set according to user's preferences when video data located on a content providing apparatus, which is a server, is displayed and played back by one or a plurality of clients when the video data is transmitted and received.

The operation control apparatus according to the present invention is provided in the content display-playback system, and enables the playback start position to be set according to user's preference when video data located on a content providing apparatus, which is a server, is displayed and played back by one or a plurality of clients when the video data is transmitted and received.

BRIEF DESCRIPTION OF THE DRAWINGS

FIG. 17 is a flowchart showing a third part of the throw operation processing procedure.

DESCRIPTION OF THE PREFERRED EMBODIMENTS

An embodiment of the present invention will be described with reference to the drawings.

Figure 1:
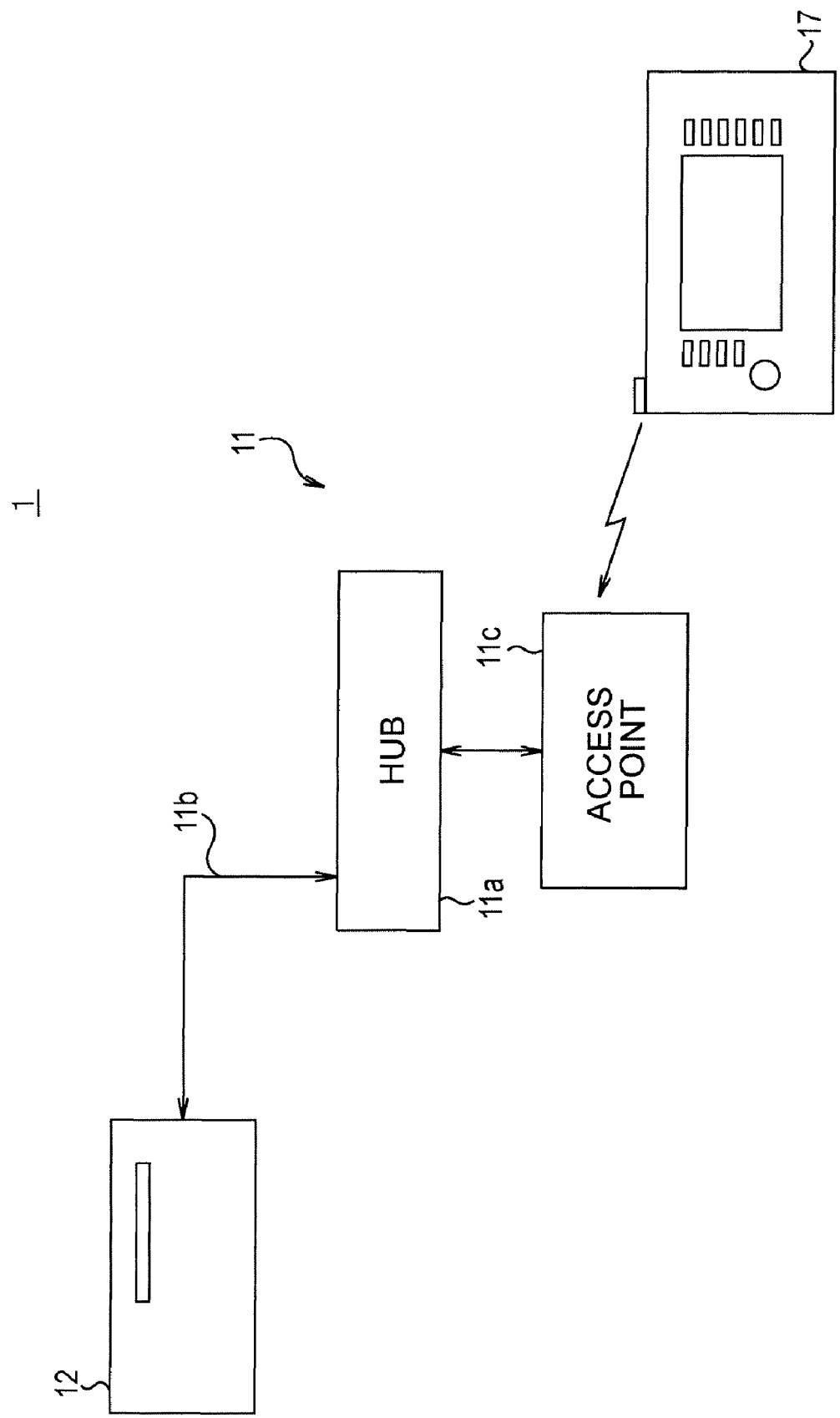
FIG. 1 is a block diagram of a content display-playback system.

FIG. 1 is a block diagram of a content display-playback system 1 according to an embodiment of the present invention. The content display-playback system 1 is configured such that a content providing apparatus 12, which is implemented by, for example, an AV content server such as a digital video recorder, is connected to a home network 11 having wired and wireless networks. An operation control apparatus 17 that controls the operation of the content providing apparatus 12 is also connected to the home network 11.

The home network 11 is an in-home digital network, and the content providing apparatus 12 is connected via a hub 11a using a wired cable 11b, e.g., an IEEE 1394 cable. A wireless LAN access point 11c is connected to the hub 11a, and the operation control apparatus 17 is wirelessly connected using a predetermined protocol, such as the IEEE 802.11 protocol or an extension to the IEEE 802.11 protocol. Therefore, the operation control apparatus 17 is connected to the content providing apparatus 12 on the home network 11, and controls the operation of the content providing apparatus 12.

Figure 2:
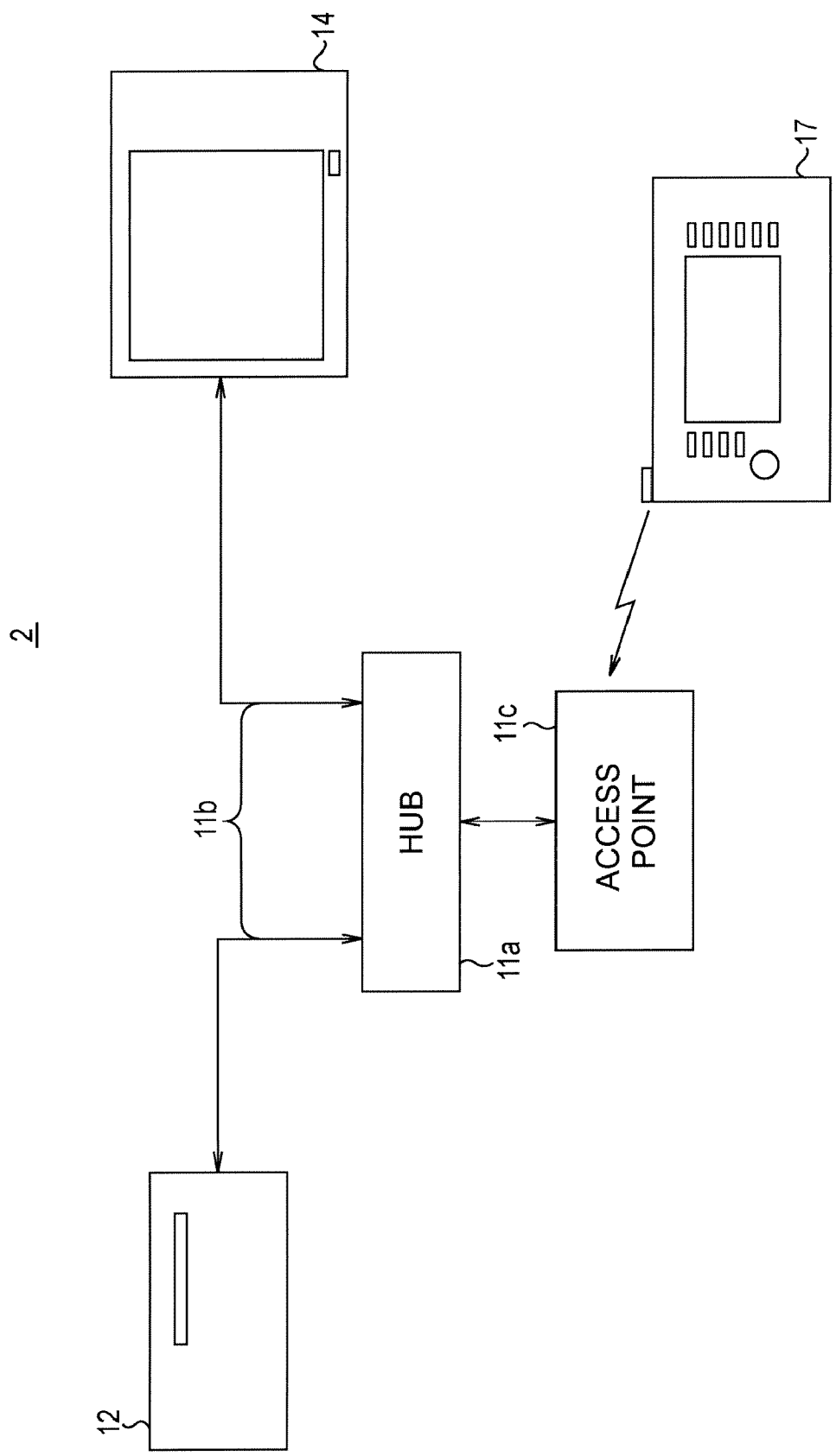
FIG. 2 is a block diagram of a content display-playback system.

FIG. 2 is a block diagram of a content display-playback system 2 in which a display-playback apparatus 14 is connected to the hub 11a. The operation control apparatus 17 is connected to the content providing apparatus 12 and the display-playback apparatus 14 on the home network 11, and controls the operations of the content providing apparatus 12 and display-playback apparatus 14.

Figure 3:
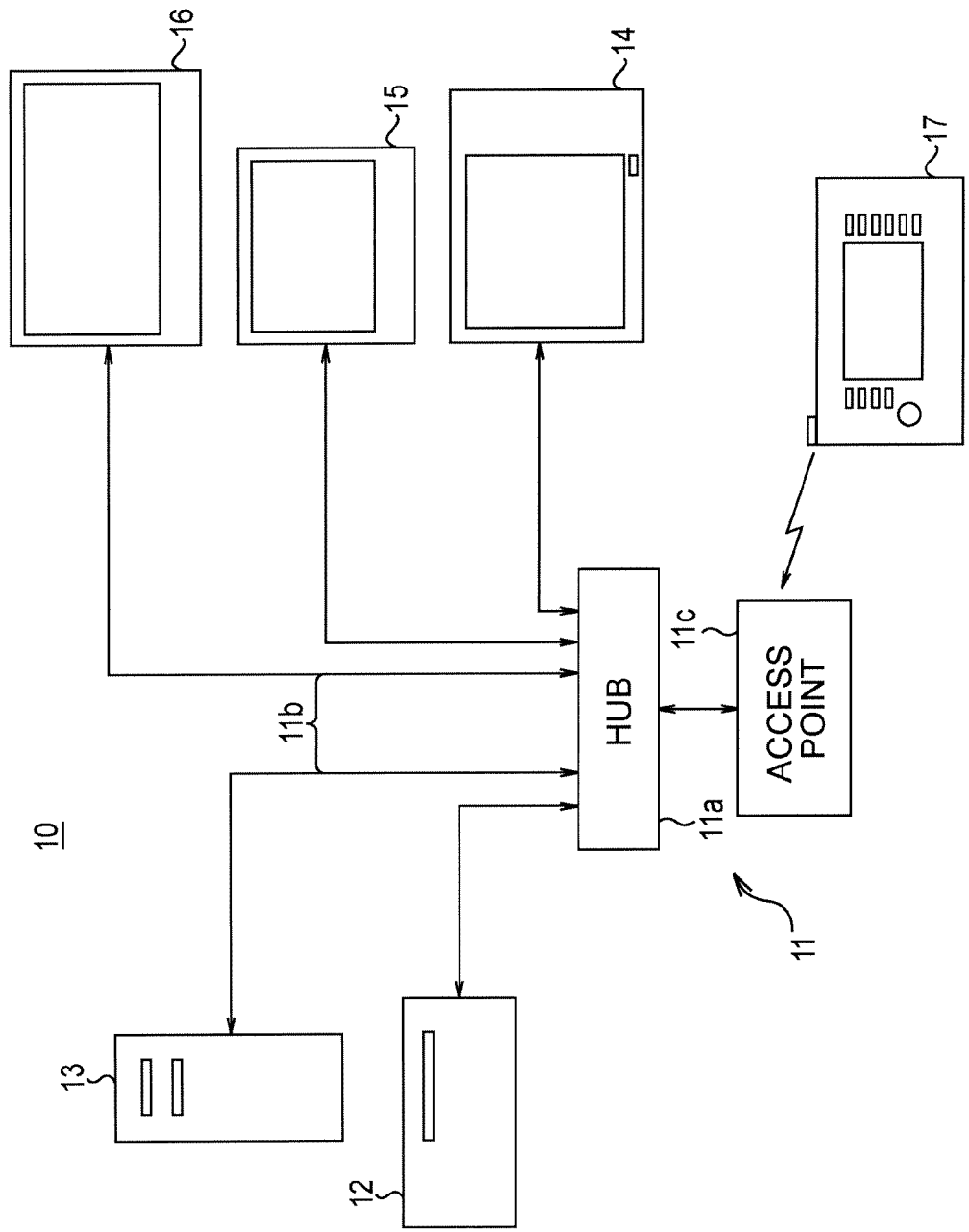
FIG. 3 is a block diagram of a content display-playback system.

FIG. 3 is a block diagram of a content display-playback system 10. In the content display-playback system 10, two content providing apparatuses, namely, content providing apparatuses 12 and 13, and three display-playback apparatuses, namely, display-playback apparatuses 14, 15, and 16, are connected to the hub 11a and the operations of these apparatuses are controlled by the operation control apparatus 17.

An embodiment of the present invention will be described in detail hereinafter in the context of the content display-playback system 2 shown in FIG. 2. It is to be understood that the arrangement described below is also applicable to the content display-playback system 1 shown in FIG. 1 and the content display-playback system 10 shown in FIG. 3. For example, the content display-playback system 1 includes at least one server (the content providing apparatus 12) that distributes audio-visual content via streaming, and at least one client (the operation control apparatus 17) that plays back the content distributed via streaming from the server in a streaming manner. The client (the operation control apparatus 17) is adapted to make settings regarding a client operation to be performed for submitting a streaming distribution request to the server (the content providing apparatus 12) to perform playback by streaming.

In the content display-playback system 2 shown in FIG. 2, the operation control apparatus 17 (which is a second client), the details of which are discussed below, is provided with a display device, such as an LCD, and is capable of receiving audio-visual (AV) content distributed via streaming and playing back the streaming content. The operation control apparatus 17 is further provided with a function (control point (CP)) of controlling other apparatuses. With the use of a wireless LAN section of the home network 11, the operation control apparatus 17, which is a second client, is able to access apparatuses on the home network 11 via the wireless LAN access point 11c. In FIG. 2, the content providing apparatus 12 is an AV server capable of distributing streaming content. The content providing apparatus 12 stores AV content. The display-playback apparatus 14 is a first client having a streaming playback function, and is controlled by the operation control apparatus 17.

Therefore, the content display-playback system 2 is a content display-playback system including at least one server (the content providing apparatus 12) capable of distributing AV content via streaming and at least one client (the operation control apparatus 17) that receives the distributed content. In the content display-playback system 2, when the operation control apparatus 17 controls a display-playback operation for content selected by the operation control apparatus 17 so that the content distributed from the content providing apparatus 12 is played back by the display-playback apparatus 14 by means of a throw operation, the operation control apparatus 17 enables the display-playback apparatus 14 to play back the content from the beginning of the content. The operation control apparatus 17 also enables the display-playback apparatus 14 to play back the content from a current position of the operation control apparatus 17 at which the throw operation is performed. The operation control apparatus 17 further enables the display-playback apparatus 14 to play back the content from the beginning of the content when a current playback position of the operation control apparatus 17 at which the throw operation is performed is less than a predetermined time.

In the content display-playback system 2, further, the operation control apparatus 17 can be used to determine whether or not a confirmation screen for allows the user to confirm acceptance of throw-based playback by the display-playback apparatus 14 is displayed when the AV content distributed from the content providing apparatus 12 is to be played back by the display-playback apparatus 14 by means of a throw operation.

In the content display-playback system 2, further, when the operation control apparatus 17 controls the display-playback operation so as to play back, by means of a catch operation, AV content currently played back by the display-playback apparatus 14 by streaming, the operation control apparatus 17 can play back the AV content from the beginning. Further, when the operation control apparatus 17 controls the display-playback operation so as to play back, by means of a catch operation, AV content currently played back by the display-playback apparatus 14 by streaming, the operation control apparatus 17 can play back the content from a current position at which the catch is performed. Further, when the operation control apparatus 17 controls the display-playback operation so as to play back, by means of a catch operation, AV content currently played back by the display-playback apparatus 14 by streaming, the operation control apparatus 17 can play back the AV content from the beginning when a current playback position of the display-playback apparatus 14 at which the catch operation is performed is less than a predetermined time.

In the content display-playback system 2, further, when the operation control apparatus 17 controls the display-playback operation so as to play back, by means of a catch operation, AV content currently played back by the display-playback apparatus 14 by streaming, it can be determined whether or not streaming playback by the display-playback apparatus 14 is terminated when the catch operation is performed.

Although the details of the settings described above are discussed below, the content display-playback system 2 is a content display-playback system in which at least one server (the content providing apparatus 12) that distributes audio-visual content via streaming and a plurality of clients (the display-playback apparatus 14 and the operation control apparatus 17) that play back the content distributed via streaming from the server in a streaming manner are connected, wherein, when a streaming distribution request is received from a second client (the operation control apparatus 17) in the plurality of clients during streaming distribution to a first client (the display-playback apparatus 14) in the plurality of clients, the second client can make settings regarding an operation of the first client and an operation of the second client. In the content display-playback system 2, therefore, a playback start position and so forth can be set according to user's preferences when video data located on the content providing apparatus 12, which is a server, is displayed and played back by one or a plurality of clients while the video data is transmitted and received among the server and the client or clients.

Figure 4:
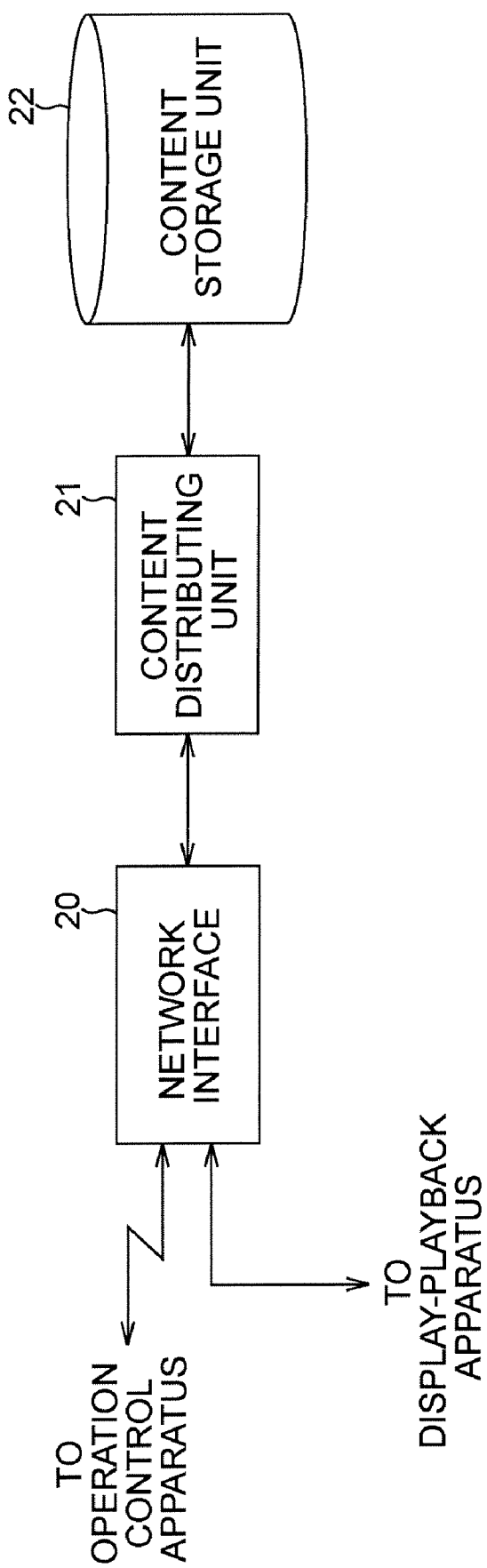
FIG. 4 is a functional block diagram of a content providing apparatus.

FIG. 4 is a functional block diagram of the content providing apparatus 12. The same applies to the content providing apparatus 13. The content providing apparatus 12 is an AV content server, such as a digital video recorder. The content providing apparatus 12 includes a network interface unit 20, a content distributing unit 21, and a content storage unit 22.

In the content display-playback system 10, the content providing apparatus 12 stores video and audio content (hereinafter referred to as "content") received at home via satellite digital broadcasting, terrestrial analog broadcasting, or the Internet in the content storage unit 22 shown in FIG. 4, which is a large-capacity storage medium such as a hard disk, as streaming data. In response to a distribution request transmitted from the operation control apparatus 17 via the network interface unit 20, the content distributing unit 21 reads and plays back the streaming data stored in the content storage unit 22, and the content providing apparatus 12 distributes the streaming data to the requesting display-playback apparatus or the operation control apparatus 17 via the network interface unit 20.

Figure 5:
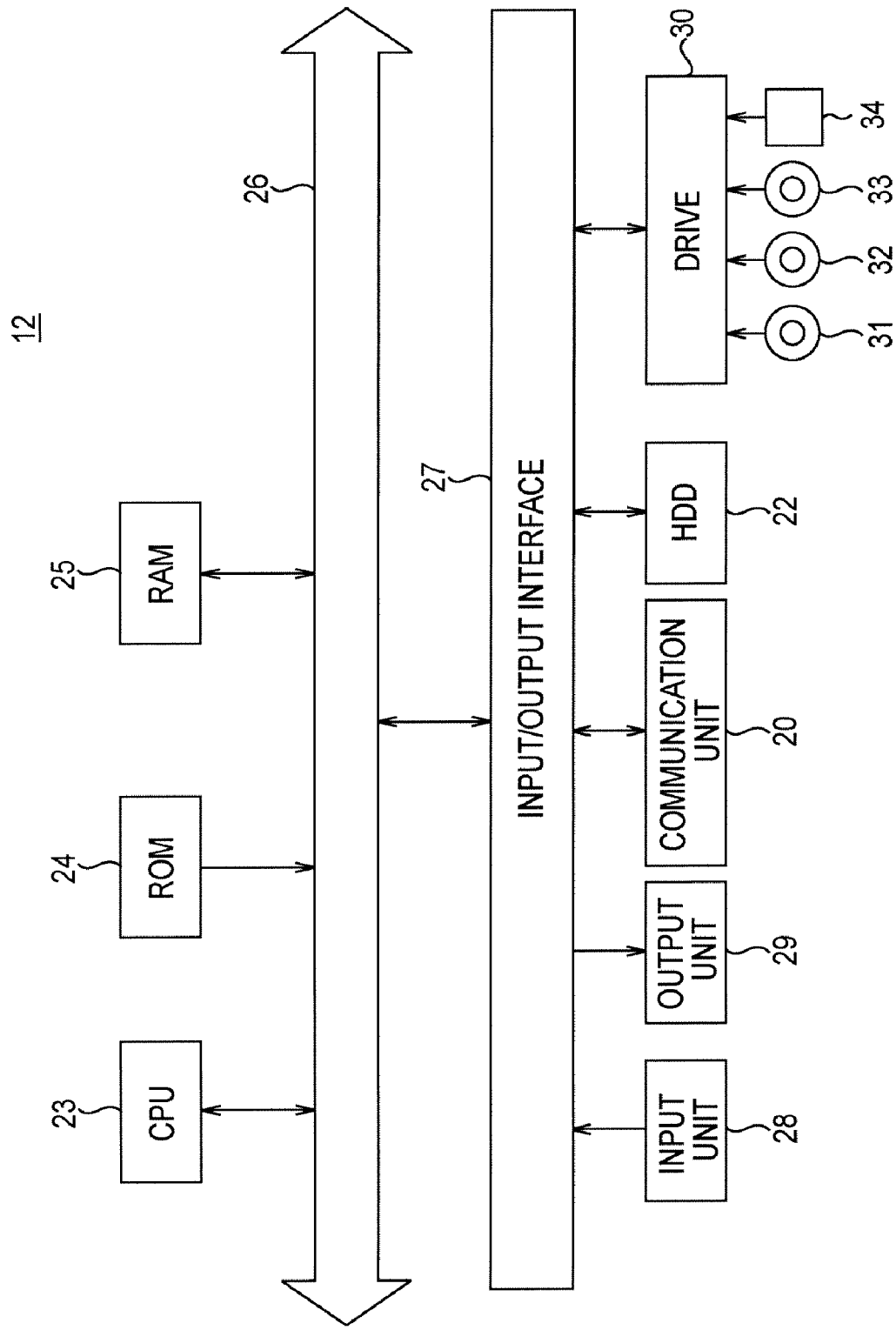
FIG. 5 is a hardware diagram of the content providing apparatus.

FIG. 5 is a diagram showing an example hardware configuration of the content providing apparatus 12. A central processing unit (CPU) 23 executes various processes according to server programs stored in a read only memory (ROM) 24 or server programs loaded from a hard disk drive 22 onto a random access memory (RAM) 25. The RAM 25 also stores data necessary for the CPU 23 to execute the various processes, if necessary.

The CPU 23, the ROM 24, and the RAM 25 are connected to one another via a bus 26. An input/output interface 27 is also connected to the bus 26.

The input/output interface 27 is connected to an input unit 28 composed of a button, a switch, a keyboard, a mouse, or the like, an output unit 29 including a display, such as a CRT or an LCD, and a speaker, a communication unit 20 composed of a modem, a terminal adapter, or the like, which functions as the network interface unit 20, and a hard disk drive 22, which functions as the content storage unit 22.

The communication unit 20 performs communication via the home network 11. In the content display-playback system 10, the communication units 20 of the content providing apparatuses 12 and 13 are connected to the wireless LAN access point 11c via the hub 11a using lines 11b. The communication units 20 are also connected to the display-playback apparatuses 14, 15, and 16 via the hub 11a using lines 11b. Thus, the content providing apparatuses 12 and 13 are connected to the operation control apparatus 17 via the communication units 20 through wireless communication paths in the home network 11, and are connected to the display-playback apparatuses 14, 15, and 16 through the wired communication paths 11b. Wireless communication is performed between the wireless LAN access point 11c and the operation control apparatus 17, discussed below, according to a predetermined protocol, such as the IEEE 802.11 protocol or an extension to the IEEE 802.11 protocol.

The hard disk drive 22 stores the server programs and media data to be distributed via streaming.

The input/output interface 27 is also connected to a drive 30, if any. A magnetic disc 31, an optical disc 32, a magneto-optical disc 33, a semiconductor memory 34, or the like is loaded in the drive 30, if any, and a computer program (such as a server program) read therefrom is installed in the hard disk drive 22, if necessary.

In relation to the functional block diagram of FIG. 4, the components shown in FIG. 5 function as follows. The communication unit 20 functions as the network interface unit 20, and the HDD 22 functions as the content storage unit 22. The CPU 23, the ROM 24, the RAM 25, and each of the media 31 to 34 connected to the drive 30 functions as the content distributing unit 21.

The operation of the content providing apparatus 12 will be described with reference to the hardware configuration. The content providing apparatus 12 is a computer, and the CPU 23 executes a streaming data distribution process according to a server program. For example, the content providing apparatus 12 stores various types of media data in the HDD 22. For example, when a request for distributing certain media data via streaming is issued from the operation control apparatus 17 via the home network 11, the content providing apparatus 12 reads the corresponding content data, generates packets for streaming distribution of the content data, and delivers the packets via the home network 11.

Figure 6:
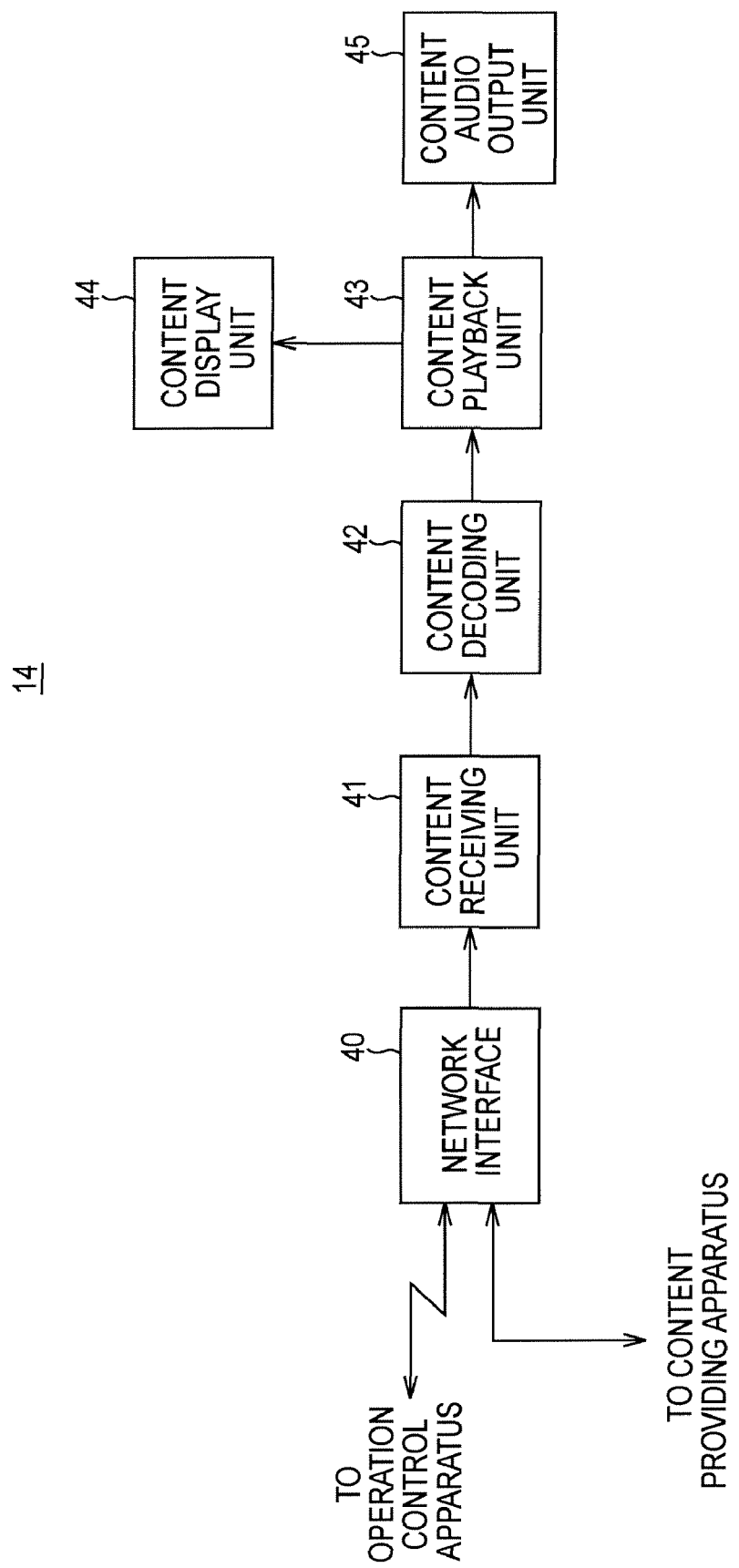
FIG. 6 is a functional block diagram of a display-playback apparatus.

FIG. 6 is a functional block diagram of each of the display-playback apparatuses 14, 15, and 16. The display-playback apparatus 14, by way of example, has a streaming playback function for receiving streaming data distributed via streaming from the content providing apparatus 12 or 13 and playing back and displaying the streaming data on an LCD or a CRT, and a function for playing back and outputting audio data associated with the video from a speaker. The display-playback apparatus 14 includes a network interface unit 40 having an interface function for connecting to the home network 11, a content receiving unit 41 that receives streaming data (content data) via the network interface unit 40, a content decoding unit 42 that decodes the content data, a content playback unit 43 that plays back the content data decoded by the content decoding unit 42, a content display unit 44 that displays the video of the played back content, and a content audio output unit 45 that outputs the audio of the played back content.

The display-playback apparatus 14 operates as a streaming playback function unit by using the function units illustrated in FIG. 6 in the following manner. The network interface unit 40 connects to the home network 11; the content receiving unit 41 receives streaming data (content data) via the network interface unit 40; the content decoding unit 42 decodes the content data; the content playback unit 43 plays back the content data decoded by the content decoding unit 42; the content display unit 44 displays the played back video of the content; and the content audio output unit 45 outputs audio associated with the video.

Figure 7:
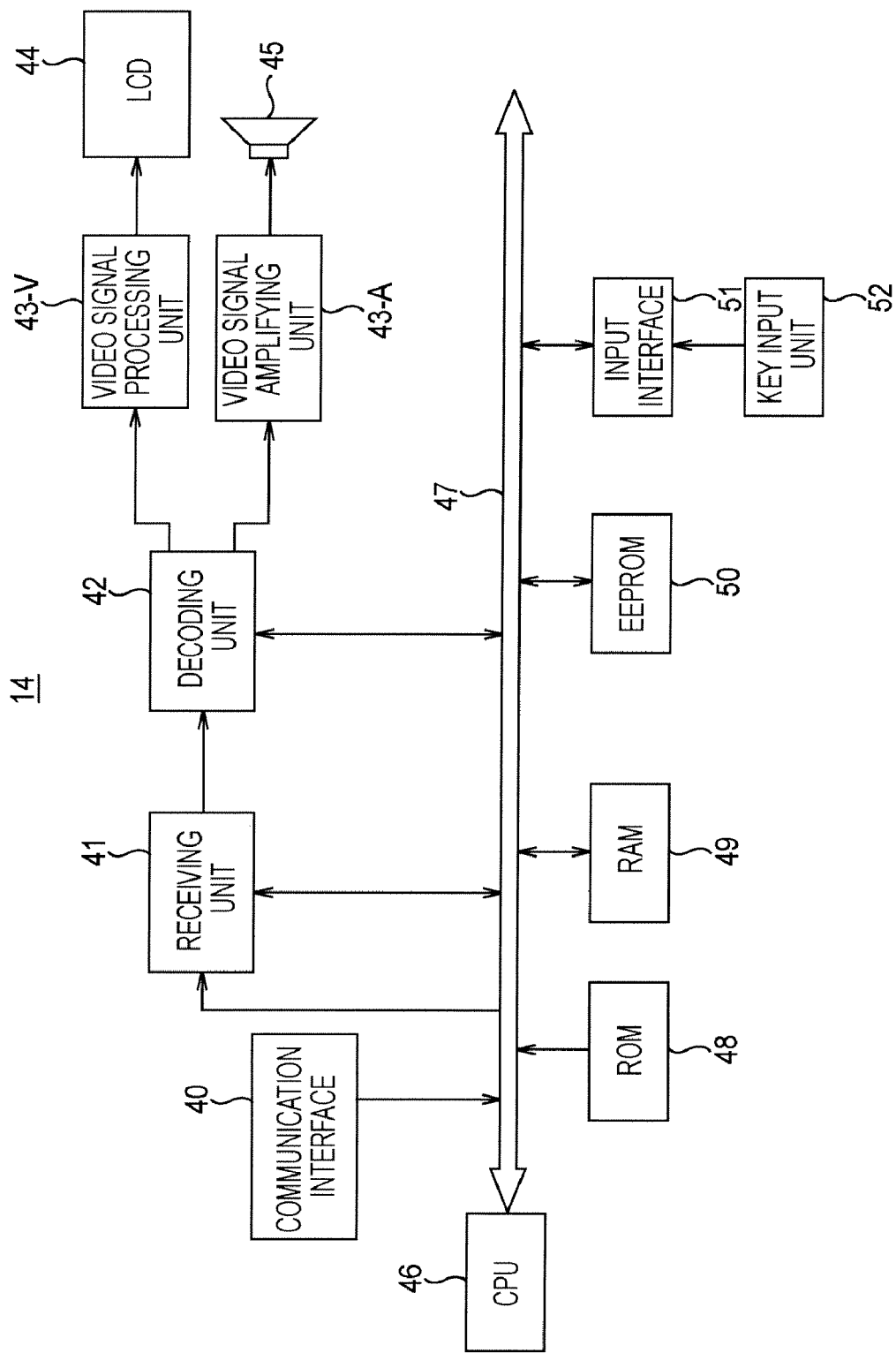
FIG. 7 is a hardware diagram of the display-playback apparatus.

FIG. 7 is a diagram showing an example hardware configuration of the display-playback apparatuses 14, 15, and 16. For example, the display-playback apparatus 14 includes a communication unit (communication interface) 40, a receiving unit 41, a decoding unit 42, a video signal processing unit 43-V, an LCD 44, an audio signal amplifying unit 43-A, and a speaker 45. The respective components of the display-playback apparatus 14 are controlled by a control unit mainly including a CPU 46. The control unit is a microcomputer in which the CPU 46, a ROM 48, a RAM 49, and an electrically erasable programmable read-only memory (EEPROM) 50 are connected via a CPU bus 47. The CPU 46 is connected to a key input unit 52 via an input interface 51, and receives an operation signal from the user, such as an audio volume control signal, an image quality control signal, or a power on/off control signal.

The ROM 48 stores various processing programs executed by the display-playback apparatus 14 and the like and data necessary for processes. The RAM 49 is used mainly as a work area for various processes, e.g., for temporarily storing data obtained in the various processes.

The EEPROM 50 is a non-volatile memory designed so that the stored information is not lost when the power is turned off, and is adapted to store and hold various setting parameters.

The communication unit (communication interface) 40 performs communication via the home network 11. In the content display-playback system 10, the communication unit 40 of the display-playback apparatus 14 is connected to the wireless LAN access point 11c via the hub 11a using the line 11b. The display-playback apparatus 14 is also connected to the content providing apparatuses 12 and 13 via the hub 11a using the lines 11b. Thus, the display-playback apparatuses 14, 15, and 16 are connected to the operation control apparatus 17 via the communication units 40 through wireless communication paths in the home network 11, and are connected to the content providing apparatuses 12 and 13 through the wired communication paths 11b.

The receiving unit 41 performs processing, such as demodulation, on the supplied signal, and supplies the demodulated signal to the decoding unit (expanding unit) 42. The content providing apparatuses 12 and 13 compress display data, such as text data and video data, and audio data of a terrestrial broadcast program, or information signals, such as video and audio signals, of a satellite broadcast program, and transmit the compressed data.

The decoding unit 42 of the display-playback apparatus 14 separates the demodulated compressed data signal supplied from the receiving unit 41 into a video signal and an audio signal, and expands (decompresses) the separated signals to recover the original signals before compression.

The decoding unit 42 performs digital/analog (D/A) conversion on the recovered video and audio signals to produce an analog video signal and an analog audio signal. The decoding unit 42 supplies the analog video signal to the video signal processing unit 43-V, and supplies the analog audio signal to the audio signal amplifying unit 43-A.

The video signal processing unit 43-V produces a display signal from the video signal supplied from the decoding unit 42, and supplies it to the LCD 44. Thus, an image corresponding to the video signal transmitted from the content providing apparatus 12 or 13 is displayed on the display screen of the LCD 44.

The audio signal amplifying unit 43-A amplifies the supplied audio signal to a predetermined level, and supplies the amplified signal to the speaker 45. Thus, sound corresponding to the audio signal associated with the video signal transmitted from the content providing apparatus 12 or 13 is output from speaker 45.

Therefore, each of the display-playback apparatuses 14 to 16 receives video and audio signals of a television broadcast program transmitted from the content providing apparatus 12 or 13 via the home network 11, and plays back and outputs the received video and audio signals, thereby providing the video and audio to the user.

Figure 8:
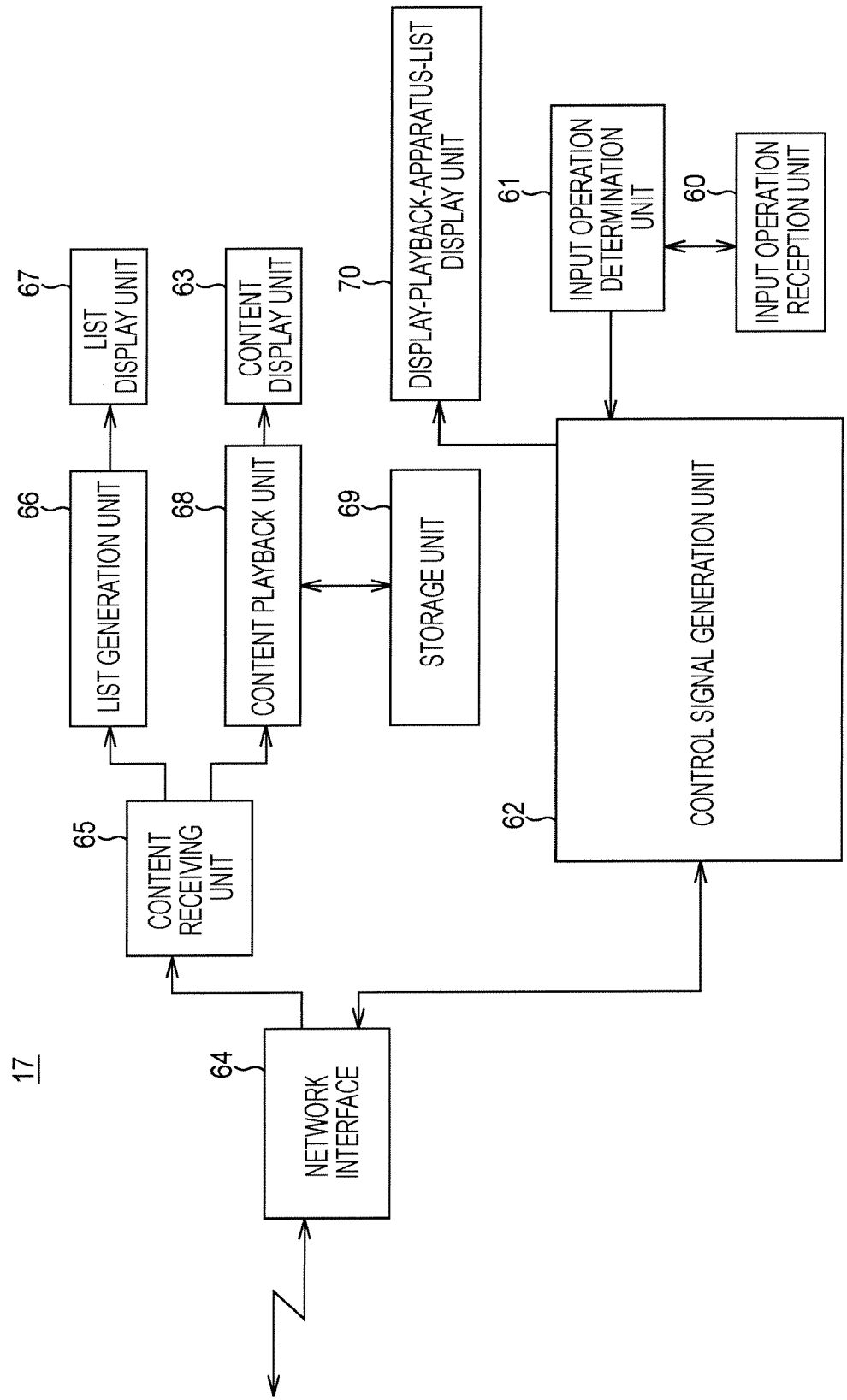
FIG. 8 is a functional block diagram of an operation control apparatus.

FIG. 8 is a functional block diagram of the operation control apparatus 17. The operation control apparatus 17 is a remote operation apparatus (remote controller) for controlling the operations of the content providing apparatuses 12 and 13 and display-playback apparatuses 14, 15, and 16 connected to the home network 11. The operation control apparatus 17 is provided with a display device, such as an LCD, and is capable of playing back AV content distributed via streaming from the content providing apparatuses 12 and 13. The operation control apparatus 17 therefore has a function of playing back AV content by streaming and a function of controlling the content providing apparatuses 12 and 13 and display-playback apparatuses 14, 15, and 16 connected to the home network 11.

Specifically, the operation control apparatus 17 controls transfer (transmission and reception or transmission) of video signal between apparatuses including the operation control apparatus 17, and controls the display of video and the playback of audio on the display-playback apparatuses 14 to 16 and the operation control apparatus 17. The operation control apparatus 17 includes an input operation reception unit 60 that receives an operation input by the user, a control signal generation unit 62 having a video-information-transmission-and-reception signal generation function of generating an operation signal for transmitting and receiving video signal between the apparatuses according to the input operation, and a display unit 63 that displays video information played back by streaming according to the operation signal generated by the control signal generation unit 62. The operation control apparatus 17 also has an audio playback function for playing back audio information to allow the user to listen to sound using internal speakers or headphones or earphones through headphone terminals. In this embodiment, the operation control apparatus 17 also functions as a display-playback apparatus for displaying and playing back content.

The operation control apparatus 17 further includes a network interface unit 64 for performing wireless communication with the wireless LAN access point 11c in the home network 11 according to a predetermined protocol, such as the IEEE 802.11 protocol or an extension to the IEEE 802.11 protocol. The operation control apparatus 17 further includes a content receiving unit 65 that receives and demodulates content-related information stored in the content providing apparatuses 12 and 13 and the content data itself.

The operation control apparatus 17 further includes a list generation unit 66 that generates a content list from the content-related information received and demodulated by the content receiving unit 65, and a list display unit 67 that displays the list generated by the list generation unit 66. The operation control apparatus 17 further includes a content playback unit 68 that decodes and plays back the content data received and demodulated by the content receiving unit 65, and a storage unit 69 that stores the content data played back by the content playback unit 68. The content data played back by the content playback unit 68 is displayed as video by the display unit 63.

The operation control apparatus 17 further includes an input operation determination unit 61 between the input operation reception unit 60 and the control signal generation unit 62 for determining the user's input operation received by the input operation reception unit 60.

The control signal generation unit 62 generates various control signals according to the determination performed by the input operation determination unit 61 on the key input performed by the user by pressing, rotating, or moving up or down the handle or the like of the input operation reception unit 60. Specific examples of the generated control signals include a throw operation signal, a catch operation signal, and a copy operation signal. The throw operation signal is a signal for allowing content data stored in a desired content providing apparatus to be played back by a desired display-playback apparatus by streaming. The catch operation signal is a signal for allowing content data displayed on a display-playback apparatus to be displayed on the display unit 63 of the operation control apparatus 17. The copy operation signal is a signal for copying content data to the storage unit 69 during the catch operation.

The control signal generation unit 62 further generates a content provider selection signal for selecting the desired content providing apparatus 12 or 13 according to a user's input operation. The control signal generation unit 62 further generates a content selection signal for selecting desired content. The content selection signal is generated according to an operation by the user viewing a content list. The content list is created by the list generation unit 66 from the content-related information received by the content receiving unit 65, and is displayed by the list display unit 67. The control signal generation unit 62 further generates a display-playback-apparatus selection signal for selecting one of the display-playback apparatuses 14, 15, and 16. The display-playback-apparatus selection signal is generated according to an operation by the user viewing a display-playback-apparatus-list displayed on the display-playback-apparatus-list display unit 70.

The control signal generation unit 62 not only generates playback operation signals for playing back content on the display unit 63 of the operation control apparatus 17 and stopping and pausing the playback, but also generates operation signals for starting, stopping, and pausing playback of content on any of the display-playback apparatuses 14, 15, and 16 selected to display the content.

Figure 9:
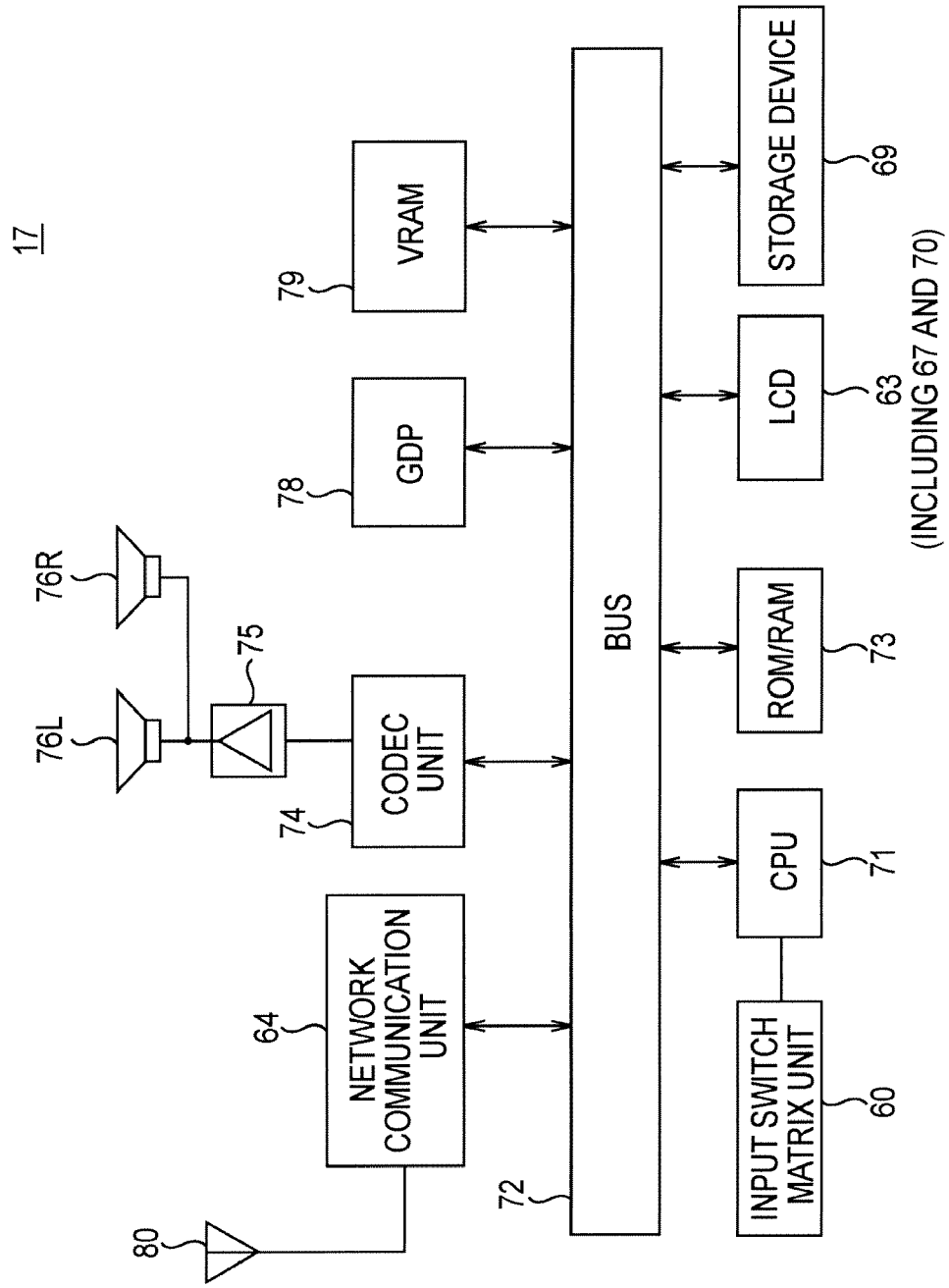
FIG. 9 is a hardware diagram of the operation control apparatus.

FIG. 9 illustrates an example hardware configuration of the operation control apparatus 17. The operation control apparatus 17 is configured such that a CPU 71 is connected to a network communication unit 64, a codec unit 74, a graphics display processor (GDP) 78, and a VRAM 79 via a bus 72. The CPU 71 is further connected to a ROM/RAM 73, an LCD 63, and a storage device 69. An input switch matrix unit 60, which is equivalent to the input operation unit 60, is connected to the CPU 71.

The network communication unit 64 performs wireless communication with the wireless LAN access point 11c via an antenna 80 according to a predetermined protocol, such as the IEEE 802.11 protocol or an extension to the IEEE 802.11 protocol, as discussed above.

The wireless communication performed by the network communication unit 64 enables the operation control apparatus 17 to transmit the control signals generated by the CPU 71, which functions as the control signal generation unit 62, according to a user's input operation via the input operation unit (input switch matrix unit) 60 to the content providing apparatuses 12 and 13 or the display-playback apparatuses 14, 15, and 16 connected to the home network 11 via the access point 11c. Further, the operation control apparatus 17 receives response signals from the respective apparatuses.

The ROM 73 stores a content display-playback program of an embodiment of the present invention, various process programs executed by the operation control apparatus 17, and data necessary for the processes. The RAM 73 is used mainly as a work area for various processes, e.g., for temporarily storing data obtained in the various processes.

The operation control apparatus 17 may further include an EEPROM, which is a non-volatile memory. The EEPROM is designed so that the stored information is not lost if the power is turned off, and is adapted to store and hold various setting parameters, etc.

The storage unit 69 is a memory device in which, for example, content data distributed via streaming from the content providing apparatus 12 or 13 is stored when a catch function is carried out. The storage unit 69 may be a semiconductor memory or an HDD.

The codec unit 74 decodes video and audio data distributed via streaming through the network communication unit 64 and separated under the control of the CPU 71. The decoded video information is subjected to video signal processing by the GDP 78, and is then displayed on the LCD 63. The audio information is amplified by an amplifier 75, and is then fed to 2-channel stereo speakers 76L and 76R to output sound from the speakers 76L and 76R.

Figure 10:
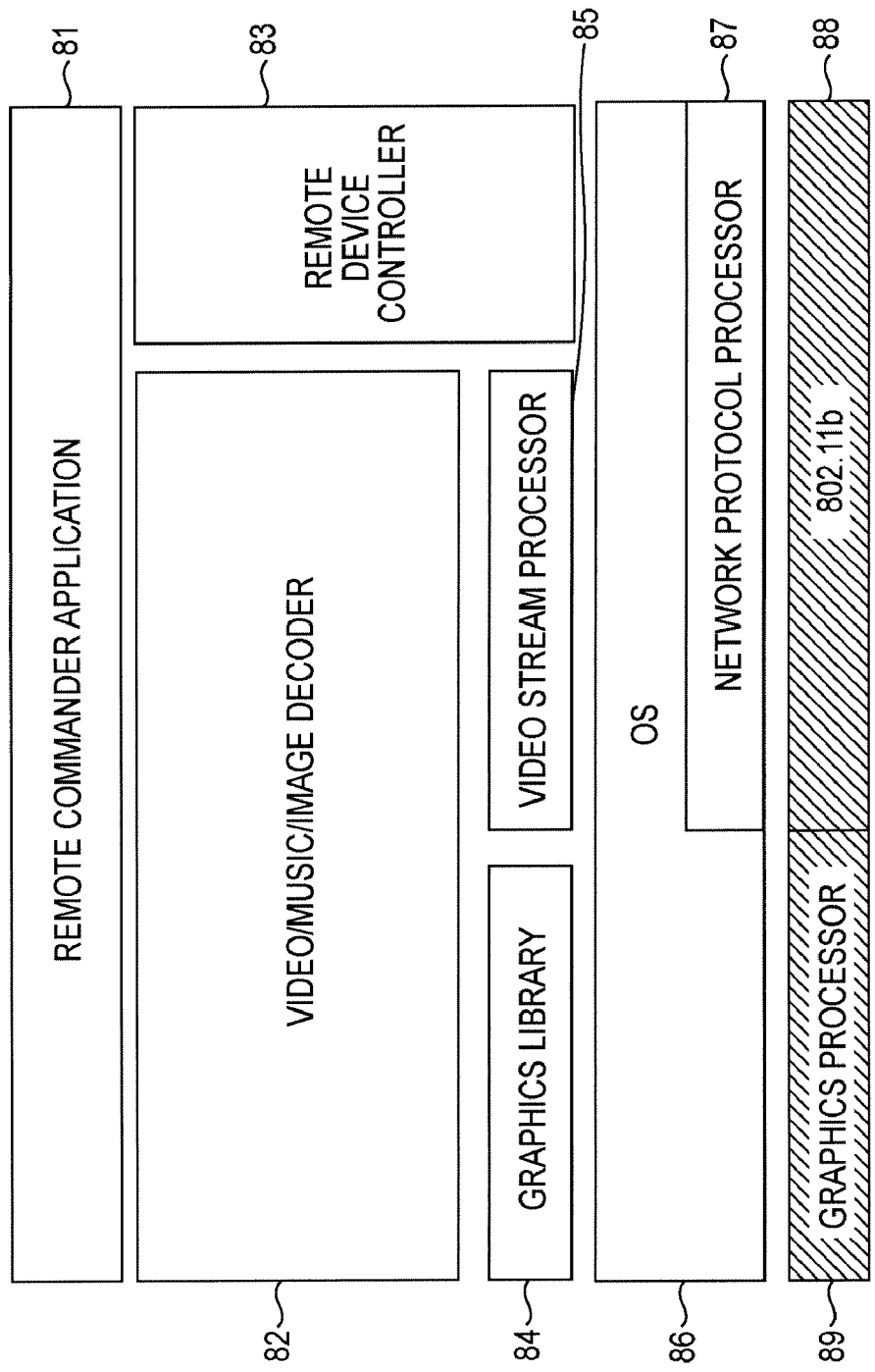
FIG. 10 is a software diagram of the operation control apparatus.

The operation control apparatus 17 of the present embodiment therefore functions not only as a remote control (remote operation) apparatus but also as a display-playback apparatus capable of displaying and playing back content. FIG. 10 is a block diagram of software executed by the CPU 71 of the operation control apparatus 17 having the above-described hardware configuration. A remote command application 81 generates a remote operation signal and controls the content providing apparatuses 12 and 13 and the display-playback apparatuses 14, 15, and 16. A video/music/image decoder 82, a remote device controller 83, a graphics library 84, and a video stream processor 85 are executed based on an operating system (OS) 86. A network protocol processor 87 executes an 802.11b wireless protocol 88, as discussed above. A graphics processor 89 is executed by the GDP 78.

Figure 11:
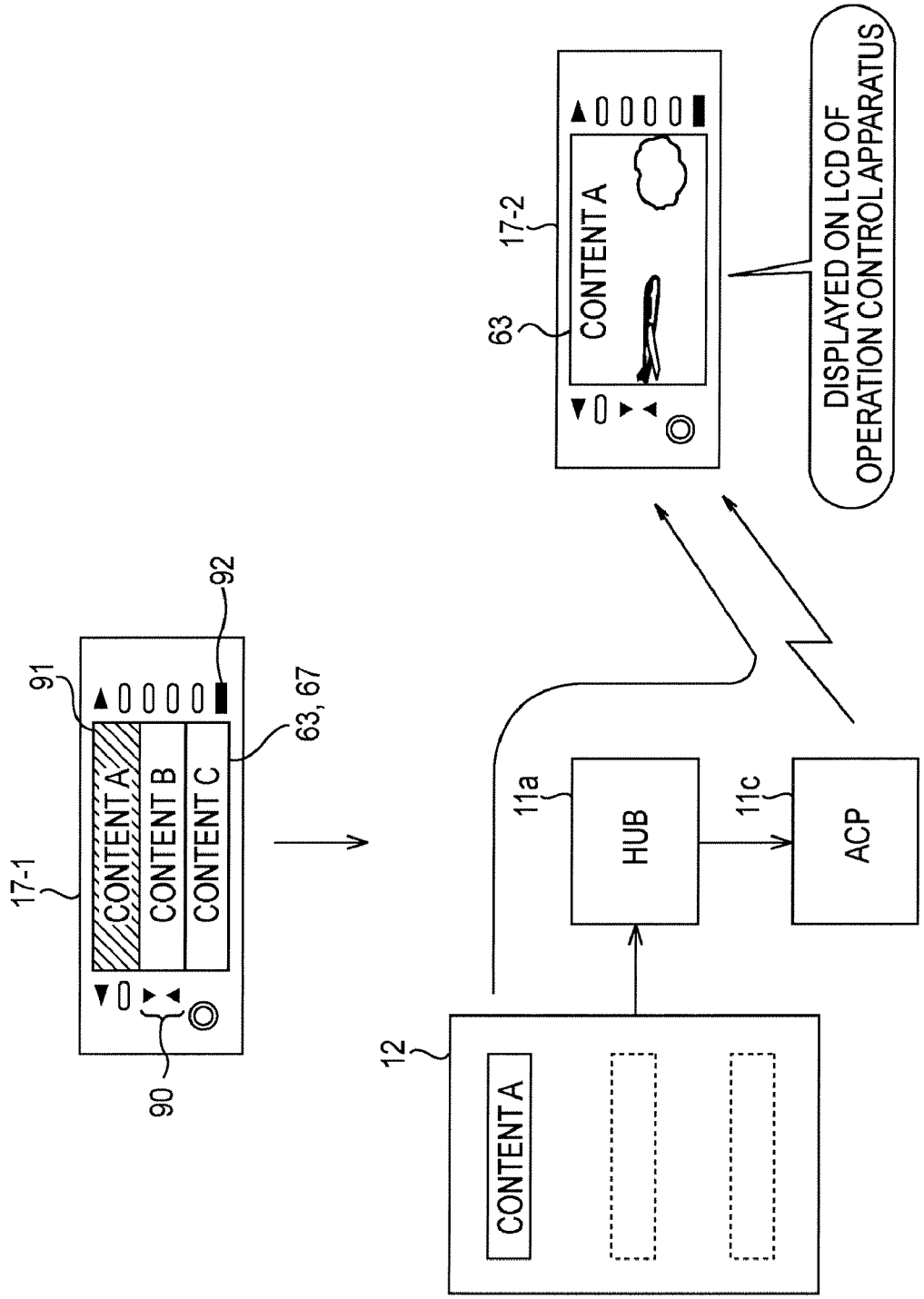
FIG. 11 is a diagram showing a display-playback process in the operation control apparatus.
Figure 12:
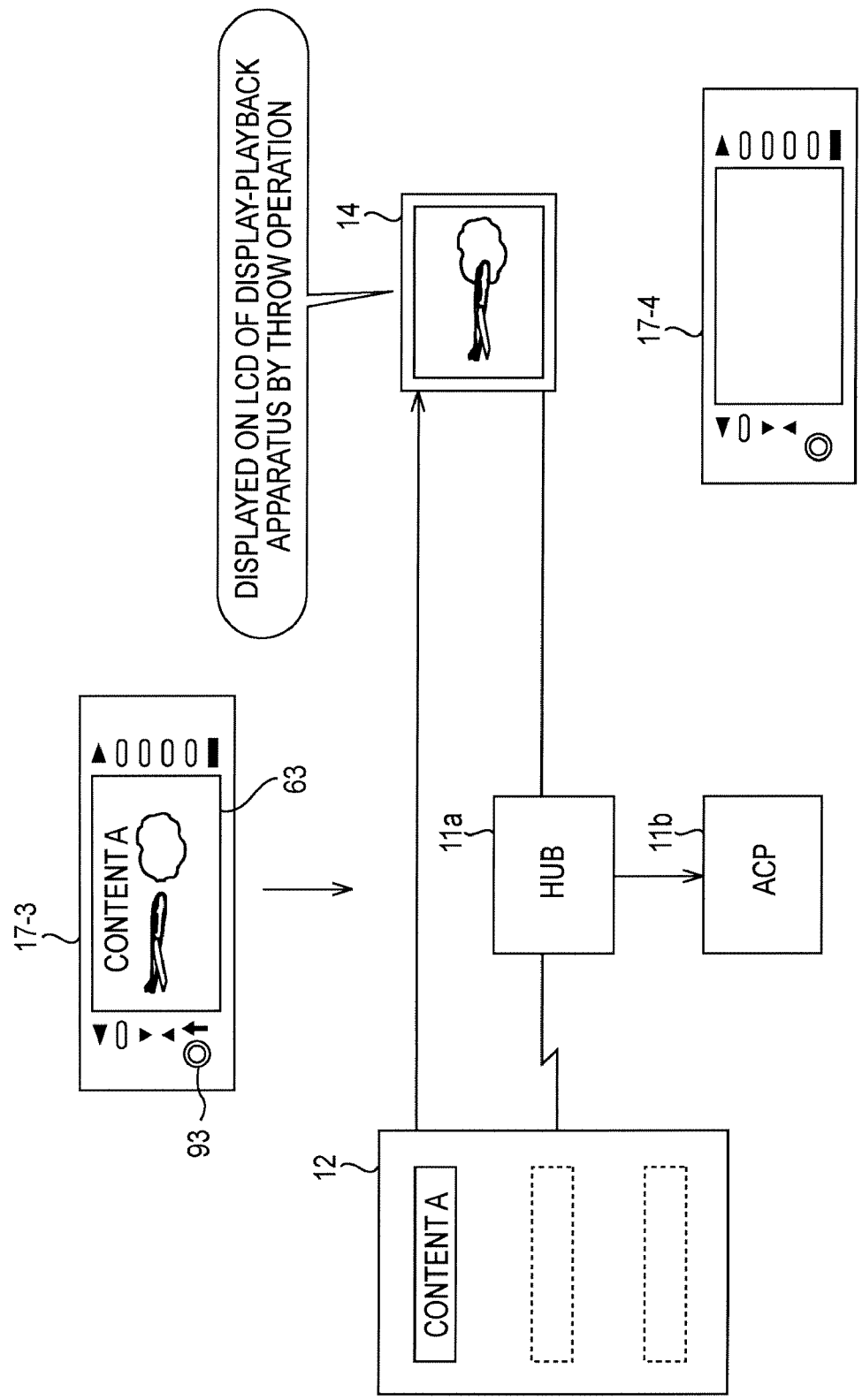
FIG. 12 is a diagram showing a throw operation by the operation control apparatus.
Figure 13:
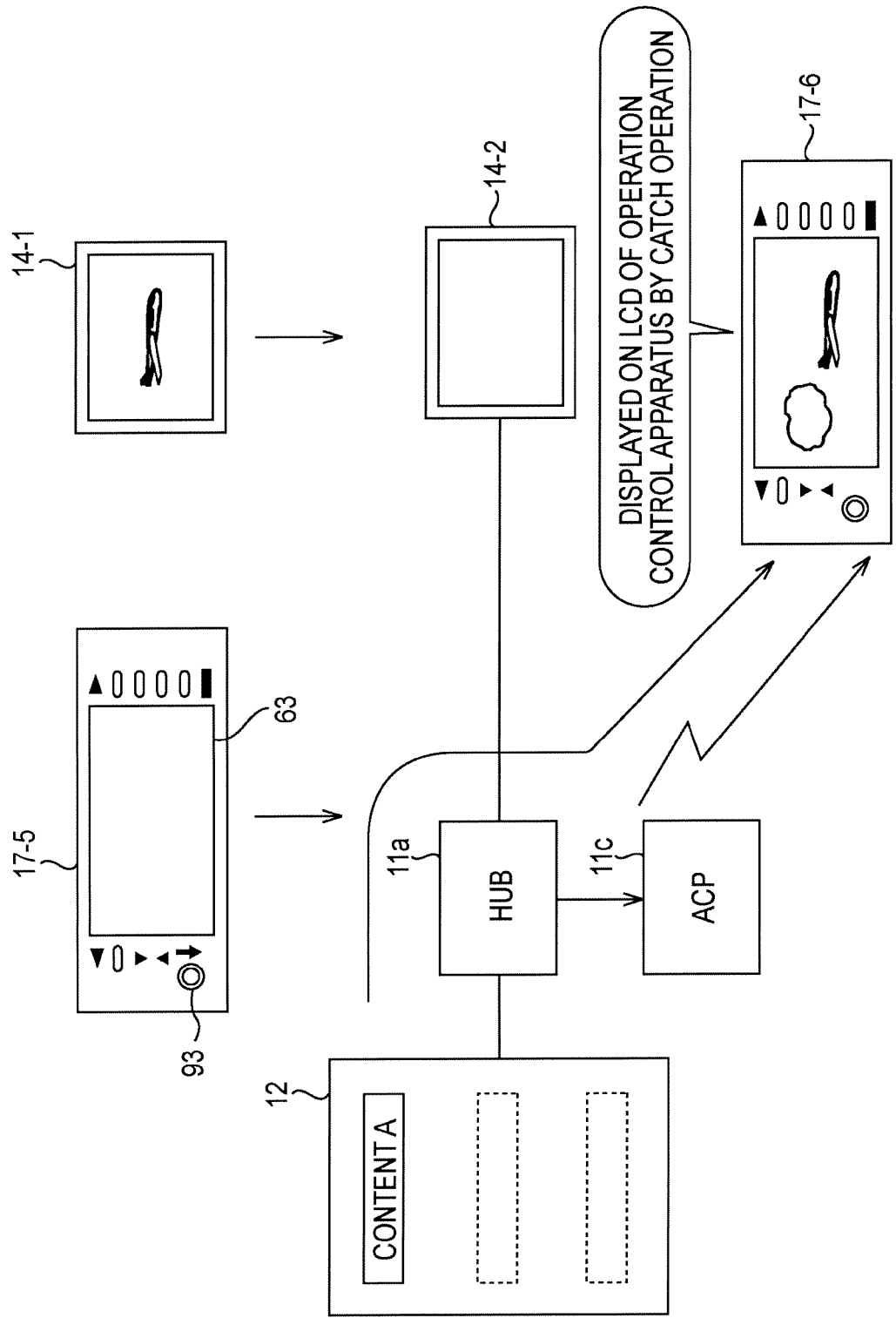
FIG. 13 is a diagram showing a catch operation by the operation control apparatus.

FIGS. 11, 12, and 13 are views provided by the content display-playback system 11, illustrating a view displayed on the operation control apparatus 17, on a view displayed on the display-playback apparatus 14 by a throw operation, and a view displayed on the operation control apparatus 17 by a catch operation, respectively.

First, referring to FIG. 11, a list of content items, e.g., content A, content B, and content C, is displayed on the LCD 63 on a display panel provided on the operation control apparatus 17 according to content information stored in the content providing apparatus 12 (17-1). The user uses a cursor movement button 90 to place a cursor 91 on the name of a desired content item to display a shaded content item on the list, and presses a set button 92 to display the selected content item, i.e., the content A, on the LCD 63 of the operation control apparatus 17 (17-2). If history information indicating that the content A has been played back to the middle exists, the content A can be played back from the middle.

Then, referring to FIG. 12, a control case where the selected content A is played back by the display-playback apparatus 14 will be described. The operation control apparatus 17 is provided with a joystick handle 93 on an operation panel of the operation control apparatus 17, and an operation of the joystick handle 93 is assigned to switching of content items. When the content A selected on the operation control apparatus 17 is to be displayed on the display-playback apparatus 14 by switching the display, the joystick handle 93 is moved up (as indicated by a black up-arrow) to perform a throw operation (17-3). The throw operation enables the content A to be played back by the display-playback apparatus 14 by streaming. The content A displayed on the LCD 63 of the operation control apparatus 17 disappears. However, the content A may still be displayed on the LCD 63. While the throw operation is performed in a state where the content A is displayed on the LCD 63 of the operation control apparatus 17, the throw operation may be performed immediately after the icon of the content A is selected on the operation control apparatus 17.

Then, referring to FIG. 13, a control case where the selected content A is played back again on the operation control apparatus 17. In the operation control apparatus 17, as discussed above, an operation of the joystick handle 93 is assigned to switching of content items. When the content A selected on the operation control apparatus 17 is displayed on the operation control apparatus 17 by switching the display from the display-playback apparatus 14 (14-1), the joystick handle 93 is moved down (as indicated by a black down-arrow) to perform a catch operation (17-5). The catch operation enables the content A to be played back by the operation control apparatus 17 in a streaming manner by changing the display of the content A from the display-playback apparatus 14 to the operation control apparatus 17 (17-6). The content A displayed on the LCD 44 of the display-playback apparatus 14 disappears (14-2). However, the content A may still be displayed on the LCD 44 of the display-playback apparatus 14.

The content display-playback system 10 is configured to make settings regarding an operation to be performed for transmitting and receiving (for example, throwing or catching) video data located on a content providing apparatus among the display-playback apparatuses 14 to 16 and the operation control apparatus 17 via the home network 11 by means of a throw operation or a catch operation using the operation control apparatus 17.

Figure 14:
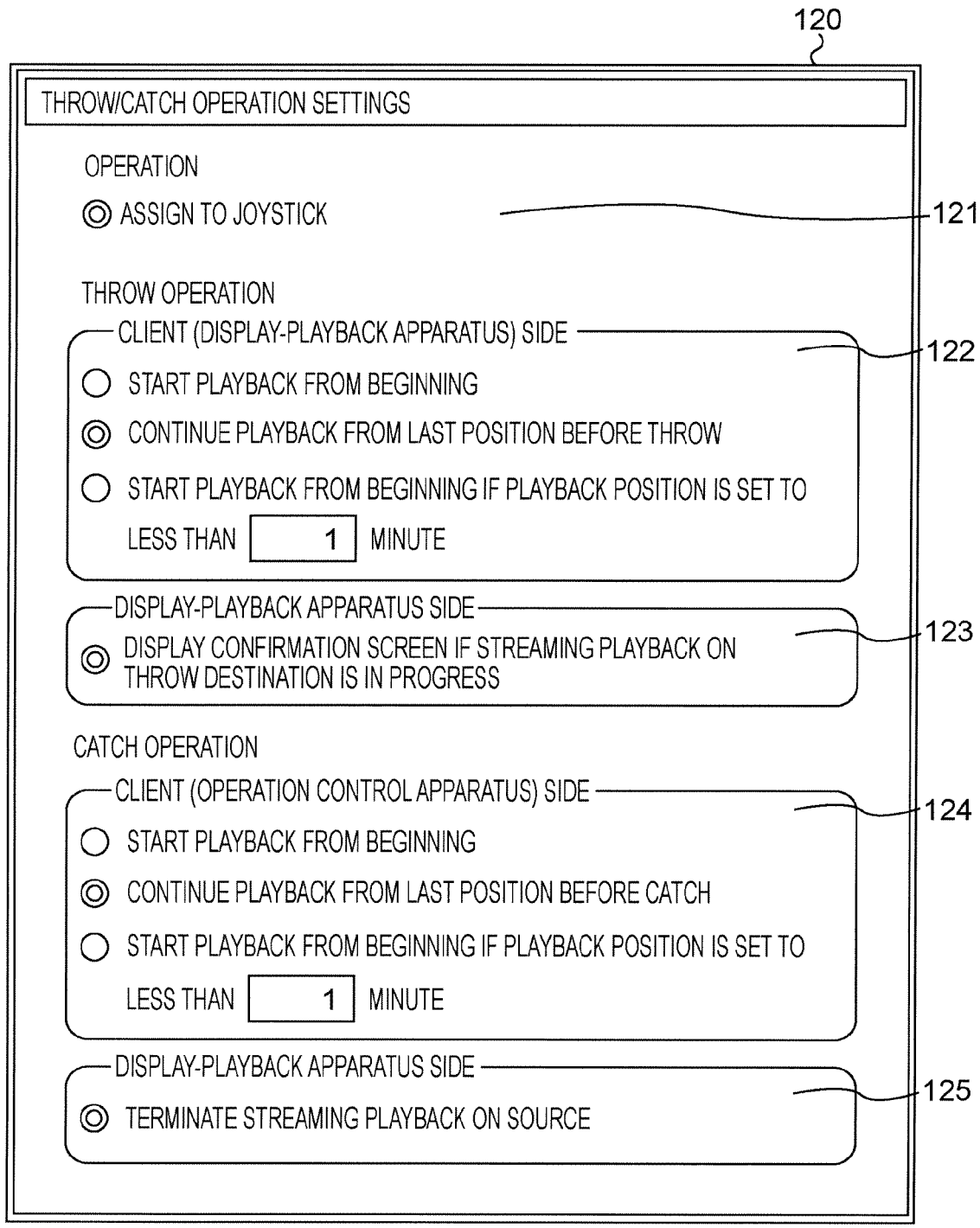
FIG. 14 is view illustrating a throw/catch operation setting menu.

FIG. 14 illustrates a throw/catch operation setting menu 120 displayed on the LCD 63 on the operation panel of the operation control apparatus 17. The throw/catch operation setting menu 120 allows the user to beforehand make settings regarding the throw and catch operations. The settings can be made using the input switch operation matrix unit 60.

The operation setting menu 120 includes an operation setting field 121 for first allowing the user to select whether or not the throw and catch operations are assigned to the joystick handle 93. In the example shown in FIG. 14, assignment of the throw and catch operations is selected. The user moves the joystick handle 93 up to give a throw instruction, and moves the joystick handle 93 down to give a catch instruction.

The settings of the throw operation in a first setting field 122 with regard to playback by the first client (the display-playback apparatus 14) will be described. The throw operation is an operation of distributing AV content via streaming from the content providing apparatus 12 to the first client (the display-playback apparatus 14) immediately after selection of content by the second client (the operation control apparatus 17) or in the middle of playback of the content on the second client (the operation control apparatus 17) and playing back the AV content on the display-playback apparatus 14 by streaming. In the first setting field 122 for the first client (the display-playback apparatus 14), any of the following options is set whenever immediately after selection of content by the operation control apparatus 17 or in the middle of playback of the content on the operation control apparatus 17:

the display-playback apparatus 14 starts playback from the beginning;

the display-playback apparatus 14 continues playback from the last playback position in the middle of the content played back by the operation control apparatus 17 when the throw operation is performed; and if the last playback position of the content played back by the operation control apparatus 17 when the throw operation is performed is less than a predetermined time, e.g., one minute, the playback-display apparatus 14 starts playback from the beginning. The user may select or enter arbitrary time as the predetermined time.

The settings of the throw operation in a second setting field 123 for the display-playback apparatus 14 will be described. The second setting field 123 allows the user to make a setting to determine whether or not a confirmation screen for allowing the user to confirm acceptance of throw-based playback is displayed when the display-playback apparatus 14 designated as the throw destination is playing back streaming content when the throw operation is performed by moving up the joystick handle 93 of the operation control apparatus 17.

Next, the settings of the catch operation in a setting field 124 with regard to playback by the second client (the operation control apparatus 17) will be described. The catch operation is an operation of switching display and playback from the first client (the display-playback apparatus 14) to the second client (the operation control apparatus 17) when the joystick handle 93 of the operation control apparatus 17 is moved down during playback of content on the display-playback apparatus 14. The setting field 124 allows the user to select any of the following options:

the operation control apparatus 17 starts playback from the beginning even if playback by the display-playback apparatus 14 stops in the middle;

the operation control apparatus 17 performs playback from the last playback position of the content played back by the display-playback apparatus 14 when the catch operation is performed; and if the last playback position of the content played back by the display-playback apparatus 14 is less than a predetermined time, e.g., one minute, playback is started from the beginning.

Next, the settings in a setting field 125 with regard to playback by the display-playback apparatus 14 after performing the catch operation will be described. The setting field 125 allows the user to set whether or not streaming playback by the display-playback apparatus 14 is terminated when a catch operation onto the operation control apparatus 17 is performed. If the setting in which streaming playback is terminated when the catch operation is performed is made, no video is displayed on the LCD 44 of the display-playback apparatus 14 when the catch operation is performed. If the setting in which streaming playback is not terminated is made, video is still displayed on the LCD 44 of the display-playback apparatus 14 when the catch operation is performed, and, therefore, both the operation control apparatus 17 and the display-playback apparatus 14 perform streaming playback.

Figure 15:
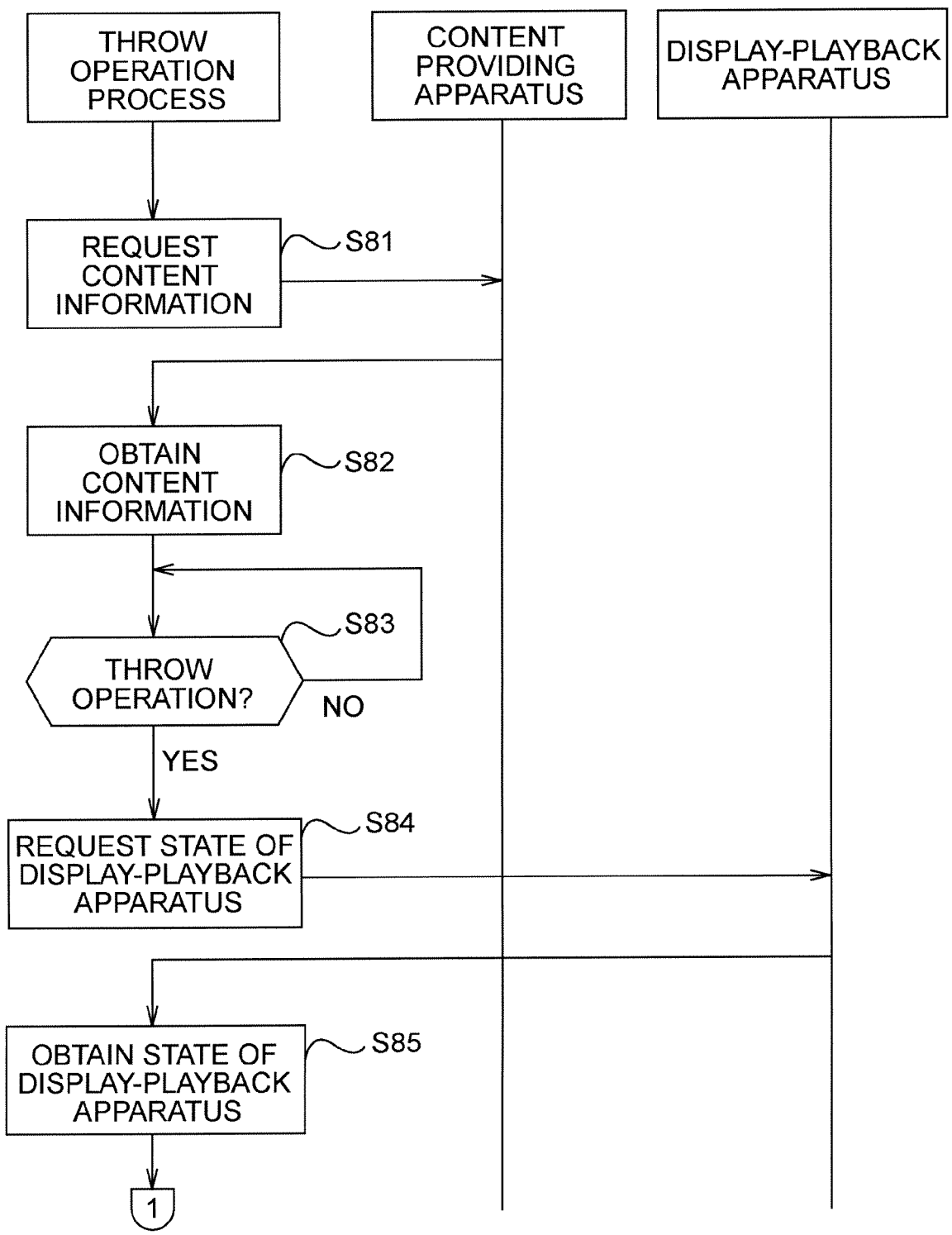
FIG. 15 is a flowchart showing a first part of a throw operation processing procedure.
Figure 16:
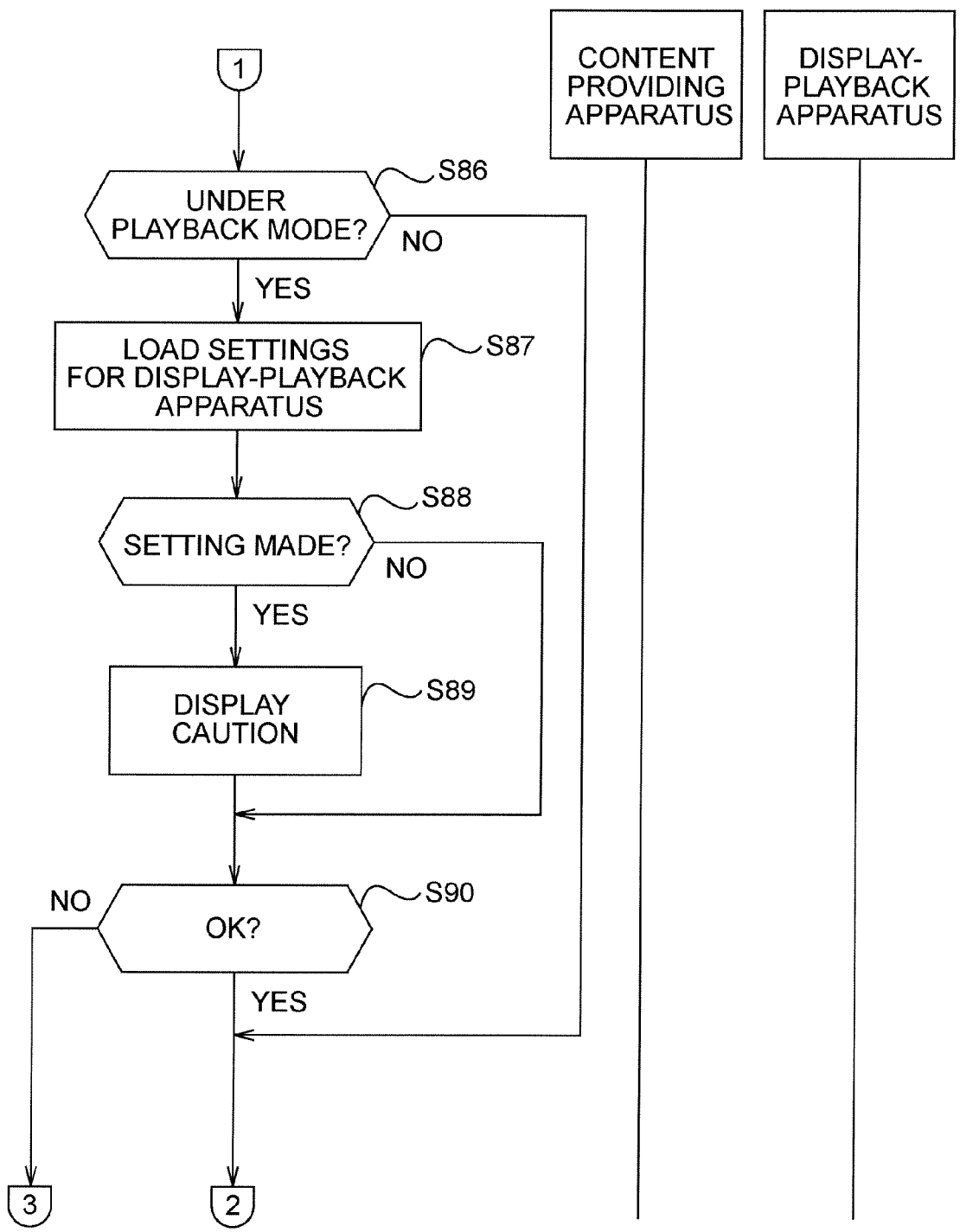
FIG. 16 is a flowchart showing a second part of the throw operation processing procedure.

FIGS. 15 to 17 are flowcharts showing a processing procedure of a throw operation on the operation control apparatus 17 according to the settings of the throw and catch operations made beforehand in the operation setting menu 120 in the manner described above.

First, in step S81, a request for content information is issued. In step S82, the content information is obtained from the content providing apparatus 12, and a content information list is displayed on the operation control apparatus 17.

When the operation control apparatus 17 detects upward movement of the joystick handle 93 on the input switch matrix unit 60 and determines that a throw operation instruction is given (YES in step S83), the operation control apparatus 17 issues a request for sending the state of the display-playback apparatus 14 designated as the throw destination to the display-playback apparatus 14 (step S84), and obtains the state from the display-playback apparatus 14 (step S85). Then, the process proceeds to step S86 shown in FIG. 16.

In step S86 shown in FIG. 16, it is determined whether or not the display-playback apparatus 14 is under the playback mode from the state of the display-playback apparatus 14 obtained in step S85. If it is determined in step S86 that the display-playback apparatus 14 is under the playback mode, the process proceeds to step S87. If it is determined in step S86 that the display-playback apparatus 14 is not under the playback mode, the process proceeds to step S91 shown in FIG. 17, discussed below. In step S87, the settings for the display-playback apparatus 14 in the second setting field 123 shown in FIG. 14 are loaded. In step S88, it is determined whether or not the setting for the display-playback apparatus 14, that is, the setting for displaying a confirmation screen for allowing the user to confirm acceptance of throw-based playback, is made. If it is determined that the setting for displaying the confirmation screen is made, then, in step S89, the confirmation screen is displayed. The confirmation screen includes messages, such as "the throw operation was requested." and "do you wish to continue the throw operation or reject the continuation?". If it is determined in step S88 that the setting for displaying the confirmation screen is not made, the process skips step S89 and proceeds to step S90. If it is determined in step S90 that the user selects "continue the throw operation" in response to the prompts on the confirmation screen, the process proceeds to step S91 shown in FIG. 17. If it is determined in step S90 that the user rejects the continuation of the throw operation, the throw operation is interrupted and terminated. In this case, the operation on the display-playback apparatus 14 still continues.

In step S91 shown in FIG. 17, the operation control apparatus 17 specifies the currently played back content. In step S92, the settings for the first client (the display-playback apparatus 14) in the first setting field 122 are loaded. In step S93, the last playback position is obtained. In step S94, the last playback position obtained in step S93 is specified in the display-playback apparatus 14. Upon receiving a response from the display-playback apparatus 14, in step S95, the operation control apparatus 17 issues a playback start request. For example, if the setting for continuing playback from a playback position at which the throw operation is performed is set in the first setting field 122 shown in FIG. 14, the operation control apparatus 17 requests the display-playback apparatus 14 to start playback from the playback position at which the throw operation is performed.

A processing procedure of the catch operation is performed by the operation control apparatus 17 in a substantially similar manner to the processing procedure of the throw operation discussed above according to the throw/catch operation settings made beforehand in the operation setting menu 120.

As described above, in the content display-playback system 2 shown in FIG. 2, the operation control apparatus 17 allow the display-playback apparatus 14 to play back the content from the beginning of the content, from a playback position of the content played back by the operation control apparatus 17 at which the throw operation is performed, or from the beginning of the content if the playback position of the content played back by the operation control apparatus 17 at which the throw operation is performed is less than a predetermined time. That is, the playback start position can be set according to user's preferences when video data located on a content providing apparatus, which is a server, is displayed and played back by one or a plurality of clients while the video data is transmitted and received.

Further, when the AV content from the content providing apparatus 12 is played back by the display-playback apparatus 14 by means of a throw operation, the user can use the operation control apparatus 17 to determine whether or not a confirmation screen for allowing the user to confirm acceptance of throw-based playback by the display-playback apparatus 14 is displayed.

Further, when the operation control apparatus 17 controls a display-playback operation so as to play back, by means of a catch operation, AV content currently played back by streaming by the display-playback apparatus 14, the operation control apparatus 17 can play back the AV content from the beginning, from a playback position at which the catch operation is performed, or from the beginning of the AV content if the playback position of the display-playback apparatus 14 at which the catch operation is performed is less than a predetermined time. That is, the playback start position can be set according to user's preferences when video data located on a content providing apparatus, which is a server, is displayed and played back by one or a plurality of clients while the video data is transmitted and received.

Further, when the operation control apparatus 17 controls a display-playback operation so as to play back, by means of a catch operation, AV content currently played back by streaming by the display-playback apparatus 14, it can be determined whether or not streaming playback by the display-playback apparatus 14 is terminated when the catch operation is performed.

Further, by loading a recording medium having recorded thereon a program implementing a content display-playback method according to an embodiment of the present invention, in a content display-playback system, an apparatus for controlling a display-playback operation of content can use existing hardware to set a playback start position according to user's preferences when video data located on a content providing apparatus, which is a server, is displayed and played back by one or a plurality of clients while the video data is transmitted and received.

It should be understood by those skilled in the art that various modifications, combinations, sub-combinations and alterations may occur depending on design requirements and other factors insofar as they are within the scope of the appended claims or the equivalents thereof.

What is claimed is:

1. A content display-playback system comprising:
   at least one server that distributes audio-visual content via streaming; and
   at least one client that plays back, by streaming, the content distributed via streaming from the server,
   the server and the client being connected, wherein
   the client beforehand makes settings regarding a client operation to be performed for submitting a streaming distribution request to the server to perform playback by streaming,
   the at least one client comprises a first client including a display-playback apparatus and a second client including a content display-playback operation control apparatus,
   the second client controls a display-playback operation for content selected by the second client and displays the content selected by the second client so that the content from the server is played back by the first client by a throw operation performed at the second client, and
   when the second client controls a display-playback operation for content selected by the second client so that the content from the server is played back by the first client by a throw operation, the second client makes settings so that the first client plays back the content from the beginning when a current playback position of the second client at which the throw operation is performed is less than a predetermined time.

2. The content display-playback system according to claim 1, wherein the second client makes the settings so that playback is performed from the beginning of the content when the first client performs playback by streaming.

3. The content display-playback system according to claim 1, wherein:
   when the second client controls a display-playback operation for content selected by the second client so that the content from the server is played back by the first client by a throw operation, the second client makes settings so that the first client plays back the content from a current playback position of the second client at which the throw operation is performed.

4. The content display-playback system according to claim 1, wherein:
   when the second client controls a display-playback operation for content selected by the second client so that the content distributed from the server is played back by the first client by a throw operation, it is determined whether or not a confirmation screen for allowing a user to confirm acceptance of throw-based playback by the first client is displayed.

5. The content display-playback system according to claim 1, wherein:
   when the second client controls a display-playback operation so as to play back, by a catch operation, content currently played back by the first client by streaming, the second client plays back the content from the beginning.

6. The content display-playback system according to claim 1, wherein:
   when the second client controls a display-playback operation so as to play back, by a catch operation, content currently played back by the first client by streaming, the second client plays back the content from a current playback position at which the catch operation is performed.

7. The content display-playback system according to claim 1, wherein:
   when the second client controls a display-playback operation so as to play back, by a catch operation, content currently played back by the first client by streaming, the second client plays back the content from the beginning when a current playback position of the first client at which the catch operation is performed is less than a predetermined time.

8. The content display-playback system according to claim 1, wherein:
when the second client controls a display-playback operation so as to play back, by a catch operation, content currently played back by the first client by streaming, it is determined whether or not streaming playback by the first client is terminated when the catch operation is performed.

9. A content display-playback method for a content display-playback system in which at least one server that distributes audio-visual content via streaming and at least one client that plays back, by streaming, the content distributed via streaming from the server are connected, the content display-playback method comprising:
allowing the at least one client to beforehand make settings regarding a client operation to be performed for submitting a streaming distribution request to the server to perform playback by streaming, wherein the at least one client comprises a first client that includes a display-playback apparatus and a second client that includes a content display-playback operation control apparatus; and
controlling, by the second client, a display-playback operation for content selected by the second client and displayed at the second client so that the content from the server is played back by the first client by a throw operation performed at the second client, wherein
when the second client controls a display-playback operation for content selected by the second client so that the content from the server is played back by the first client by a throw operation, the second client makes settings so that the first client plays back the content from the beginning when a current playback position of the second client at which the throw operation is performed is less than a predetermined time.

10. A non-transitory recording medium having a content display-playback program recorded thereon, the content display-playback program being executed by a content display-playback system in which at least one server that distributes audio-visual content via streaming and at least one client that plays back, by streaming, the content distributed via streaming from the server are connected, wherein
the content display-playback program allows the at least one client to make settings regarding a client operation to be performed for submitting a streaming distribution request to the server to perform playback by streaming, wherein the at least one client comprises a first client that includes a display-playback apparatus and a second client that includes a content display-playback operation control apparatus,
the second client controls a display-playback operation for content selected by the second client and displayed at the second client so that the content from the server is played back by the first client by a throw operation performed at the second client, and
when the second client controls a display-playback operation for content selected by the second client so that the content from the server is played back by the first client by a throw operation, the second client makes settings so that the first client plays back the content from the beginning when a current playback position of the second client at which the throw operation is performed is less than a predetermined time.

11. An operation control apparatus in a content display-playback system, the operation control apparatus being used as a client connected to a server that distributes audio-visual content via streaming, the operation control apparatus being operable to play back, by streaming, the content distributed via streaming from the server, wherein
the operation control apparatus beforehand makes settings regarding a client operation to be performed for submitting a streaming distribution request to the server via a communication interface of the operation control apparatus to perform playback by streaming,
the operation control apparatus includes a processor configured to control a display-playback operation for content selected by the operation control apparatus and displayed at the operation control apparatus so that the content from the server is played back by a first client connected to the operation control apparatus by a throw operation performed at the operation control apparatus, and
when the processor of the operation control apparatus controls a display-playback operation for content selected by the operation control apparatus so that the content from the server is played back by the first client by a throw operation, the operation control apparatus makes settings so that the first client plays back the content from the beginning when a current playback position of the operation control apparatus at which the throw operation is performed is less than a predetermined time.

12. The operation control apparatus according to claim 11, wherein the streaming distribution to the operation control apparatus and the streaming distribution request submitted to the server are performed by the communication interface of the operation control apparatus via wireless communication.

13. A content display-playback system comprising:
a server configured to distribute content via streaming;
a first client including a display-playback apparatus configured to reproduce the content distributed by the server; and
a second client including a content display-playback operation control apparatus configured to reproduce the content distributed from the server, wherein
the second client controls a display-playback operation for content selected by the second client and displays the content selected by the second client so that the content from the server is played back by the first client by a throw operation performed at the second client, and
when the second client controls a display-playback operation so as to play back, by a catch operation, content currently played back by the first client by streaming, the second client automatically starts playing back the content from the beginning upon initiation of the catch operation.

14. A content display-playback system comprising:
a server configured to distribute content via streaming;
a first client including a display-playback apparatus configured to reproduce the content distributed by the server; and
a second client including a content display-playback operation control apparatus configured to reproduce the content distributed from the server, wherein
the second client controls a display-playback operation for content selected by the second client and displays the content selected by the second client so that the content from the server is played back by the first client by a throw operation performed at the second client, and
when the second client controls a display-playback operation so as to play back, by a catch operation, content currently played back by the first client by streaming, the second client plays back the content from the beginning when a current playback position of the first client at which the catch operation is performed is less than a predetermined time.

* * * * *